US012579177B2

(12) United States Patent
    Takamine et al.

(10) Patent No.: US 12,579,177 B2
(45) Date of Patent: Mar. 17, 2026

(54) CONTEXT MANAGEMENT IN A HIERARCHICAL AGENT MODEL

(71) Applicant: Invisible Platforms, Inc., Santa Clara, CA (US)

(72) Inventors: Justin Takamine, Sunnyvale, CA (US); Minh Pham, Palo Alto, CA (US)

(73) Assignee: Invisible Platforms, Inc., Santa Clara, CA (US)

( * ) Notice: Subject to any disclaimer, the term of this patent is extended or adjusted under 35 U.S.C. 154(b) by 0 days.

(21) Appl. No.: 18/635,942

(22) Filed: Apr. 15, 2024

(65) Prior Publication Data

US 2025/0322000 A1      Oct. 16, 2025

(51) Int. Cl.
    *G06F 16/334*          (2025.01)
    *G06F 16/383*          (2019.01)
(52) U.S. Cl.
    CPC ...... *G06F 16/3344* (2019.01); *G06F 16/3347* (2019.01); *G06F 16/383* (2019.01)
(58) Field of Classification Search
    CPC . G06F 16/3344; G06F 16/3347; G06F 16/383
    USPC .............. 707/728, 737, 740, 741, 748, 771, 707/999.001, 999.003, 999.01, 17.116, 707/17.108, 17.002, 17.01
    See application file for complete search history.

(56) References Cited

U.S. PATENT DOCUMENTS

| | | | | |
|---|---|---|---|---|
| 9,324,022 B2 * | 4/2016 | Williams, Jr. | ......... | G06N 3/084 |
| 2005/0222631 A1 * | 10/2005 | Dalal | ................. | A61N 1/37282 |
| | | | | 607/27 |
| 2015/0254555 A1 * | 9/2015 | Williams, Jr. | ......... | G06N 3/045 |
| | | | | 706/14 |
| 2023/0084278 A1 * | 3/2023 | Baek | ....................... | G06F 17/16 |
| | | | | 706/46 |
| 2023/0136564 A1 * | 5/2023 | Goyal | ...................... | G06N 5/02 |
| | | | | 706/46 |
| 2024/0070319 A1 * | 2/2024 | Cai | ...................... | G06F 21/6245 |
| 2024/0378247 A1 * | 11/2024 | Kelly | .................... | G06F 16/355 |

\* cited by examiner

*Primary Examiner* — MD I Uddin
(74) *Attorney, Agent, or Firm* — Alston & Bird LLP

(57)                ABSTRACT

In some embodiments, a method may include determining hierarchical agents including a first agent and a second agent based on a document defining a UI, the hierarchical agents having access to initial context data. The method may include delegating a task related to a UI element to the first agent based on information associated with the UI element and restricting portions of the initial context data available to the first agent to a propagated subset based on input data types mapped to the first agent and portions of the initial context data available to the second agent. The method may include generating interaction data by providing a machine learning model with the propagated subset and updating the document (e.g., by populating or interacting with the UI element based on the interaction data).

19 Claims, 5 Drawing Sheets

100

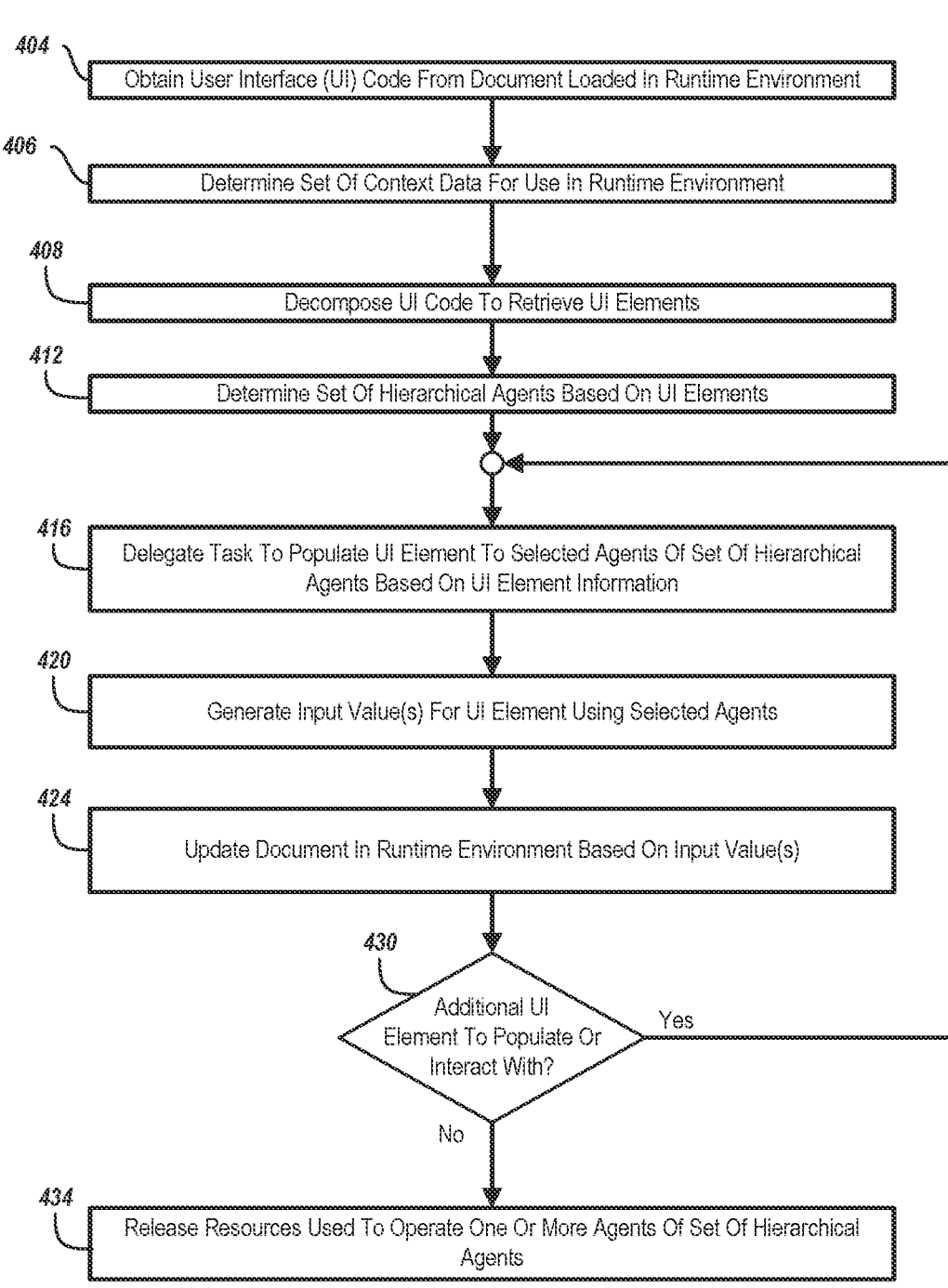

400

404 — Obtain User Interface (UI) Code From Document Loaded In Runtime Environment 406 — Determine Set Of Context Data For Use In Runtime Environment 408 — Decompose UI Code To Retrieve UI Elements 412 — Determine Set Of Hierarchical Agents Based On UI Elements 416 — Delegate Task To Populate UI Element To Selected Agents Of Set Of Hierarchical Agents Based On UI Element Information 420 — Generate Input Value(s) For UI Element Using Selected Agents 424 — Update Document In Runtime Environment Based On Input Value(s)

430 — Additional UI Element To Populate Or Interact With?    Yes    No

434 — Release Resources Used To Operate One Or More Agents Of Set Of Hierarchical Agents

FIG. 4

CONTEXT MANAGEMENT IN A HIERARCHICAL AGENT MODEL

SUMMARY

Though machine learning models can help integrate data integration operations among web applications by analyzing and interacting with a front-end user interface (UI) of a web application, such operations are beset by multiple obstacles. First, even minor updates to the structure of a UI (e.g., splitting fields across different screens, changing a field name, etc.) can break machine models designed for specific interface types. Furthermore, conventional machine learning models are computationally expensive to use and can become impractical to apply to applications that require real-time or near-real-time responses in order to provide accurate results.

Some embodiments may use hierarchical agents to provide data integration services. However, though hierarchical agent models are powerful tools to help perform UI-based data integration, performance limitations on agents can hamper practical use of agents that use computationally expensive operations. In many cases, the unrestricted availability of data to an agent can be a liability instead of a benefit, because such volumes of data can make deep learning operations computationally expensive and increase the likelihood of obtaining inaccurate or even irrelevant results. For example, the large volume of input data available to an agent relying on a large language model (LLM) can provide inaccurate or even nonsensical recommendations when populating the fields of a web application's UI or interacting with other UI elements of the UI.

Some embodiments may overcome the technical issue described above by using a hierarchical data integration system executed in the runtime environment of a web application (hierarchical runtime system). A hierarchical runtime system can include a set of hierarchical agents that is adapted to analyze web documents or other data in the runtime environment of a web browser or other application. Some embodiments may decompose the UI code of a document within a runtime environment into UI input elements or other UI elements, where the set of hierarchical agents may be operating in the same runtime environment as that used to execute the UI code. For example, some embodiments may use a set of hierarchical agents operating in a runtime environment and may decompose a hypertext markup language (HTML) document that defines a UI in the same runtime environment, where the UI may have been selected based on previously selected user inputs. The results of the decomposition operation may include UI elements such as text entry fields, numeric entry fields, drop-down menus, checkboxes, sliders, form submission button, or other interactive UI elements.

Some embodiments may categorize the resulting UI elements to obtain input data types (e.g., an information domain, an input method type, etc.) and use the input data types to construct a set of hierarchical agents that can dynamically respond to changes in the UI. For a selected target UI element, the set of hierarchical agents may use a root agent or other higher-level agent to delegate a task (e.g., to populate the target UI element, to interact with the target UI element, etc.) to a leaf agent or other task-performing agent. For example, some embodiments may provide, as an input, a higher-level agent with information related to the target UI element (e.g., an element identifier). The higher-level agent may then delegate the task to a leaf agent based on the results of a decision model that used the information as an input. The leaf agent may then use a machine learning model to generate input data based on the target UI element and user-provided information (e.g., information provided in a different runtime environment). Some embodiments may then update the document defining the UI or other data used to present the UI in the runtime environment, where the update may populate the target UI element with the input data or cause other updates with respect to the target UI element using the input data.

Some embodiments may further overcome the technical issue described above by using a context-managed hierarchical agent model. For example, a context-managed hierarchical agent model may include a set of hierarchical agents, where a root agent of the context-managed hierarchical agent model can access initial data representing a global context of a web document or other UI-defining document. Furthermore, during or after delegating a task to populate or interact with a target UI element to a child agent, some embodiments may restrict the data available to the child agent to a propagated subset of a parent agent of the child agent. Some embodiments may determine the propagated subset based on input data types mapped to the child agent, such as by restricting data available to the child agent to be limited to data that is (1) mapped to the input data types and (2) available to the parent agent of the child agent. The child agent may then use an LLM or other machine learning model to generate the input data by using, as a set of inputs for the LLM, the propagated subset available to the child agent, where the input data is used to populate or interact with the target UI element (e.g., one or more user-provided values, instructions for interacting with the target UI element, etc.).

Such operations allow the hierarchical runtime system to accommodate significant variations in how a UI is formed, structured, formatted, or even dynamically altered between different users or even different communications sessions for the same user. Furthermore, the use of a hierarchical agent in the runtime environment can permit more efficient processing by detecting similarities between different UIs of different applications and combining computationally expensive operations for populating the fields of those UIs or interacting with other UI elements of those UIs.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

FIG. 4 is a flowchart of a process for initializing a set of hierarchical agents in a runtime environment, in accordance with one or more embodiments.

Figure 1:
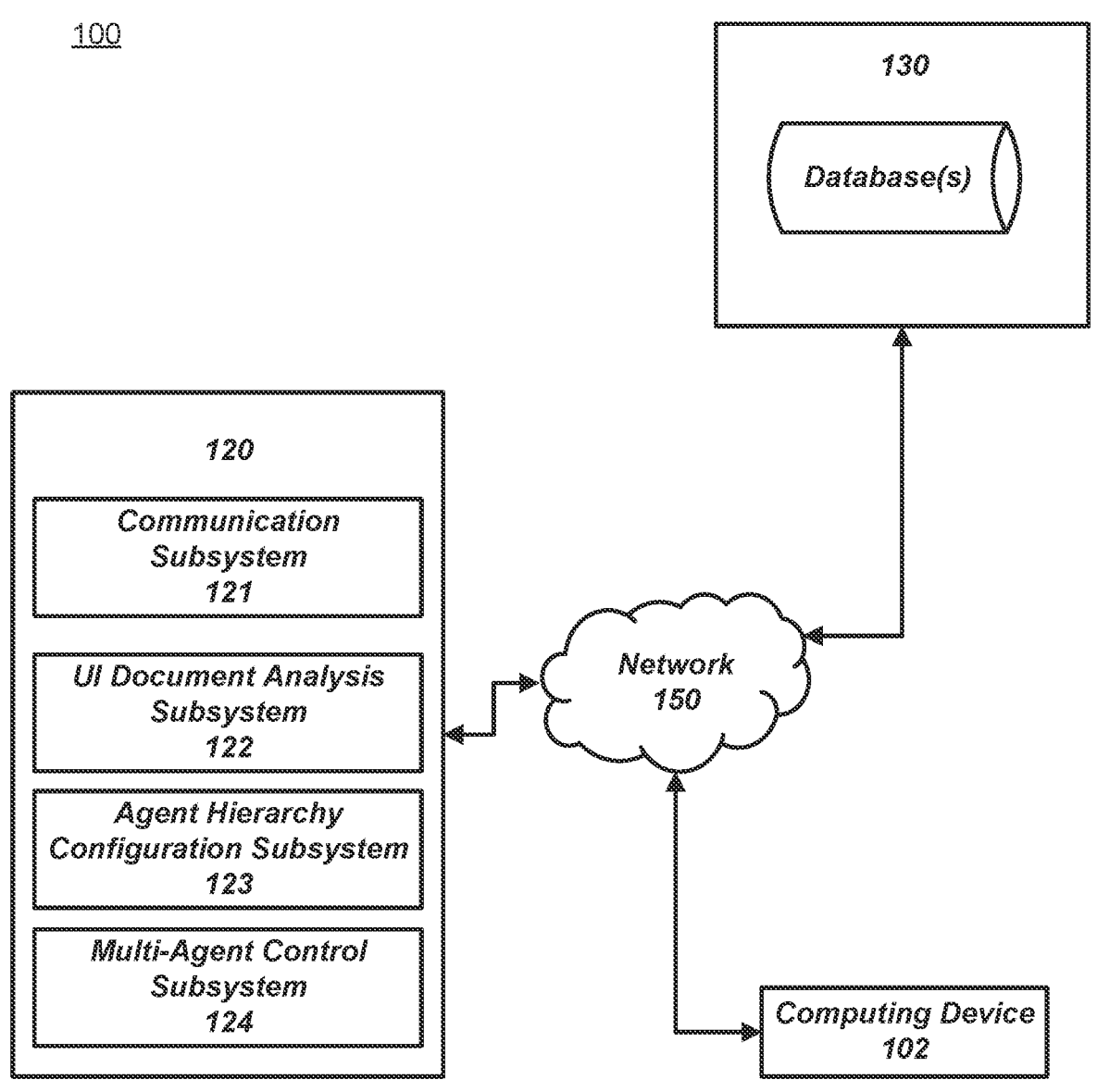
FIG. 1 illustrates a system for using one or more dynamic sets of hierarchical agents in different runtime environments, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates a system for using one or more dynamic sets of hierarchical agents in different runtime environments, in accordance with some embodiments. The system 100 includes a computing device 102. The computing device 102 may include computing devices such as a desktop computer, a laptop computer, a wearable headset, a smartwatch, another type of mobile computing device, a transaction device, etc. In some embodiments, the computing device 102 may communicate with various other computing devices via a network 150, where the network 150 may include the internet, a local area network, a peer-to-peer network, etc. The computing device 102 may send and receive messages through the network 150 to communicate with a set of servers 120 within a first data center region, where the set of servers 120 may include a set of non-transitory storage media storing program instructions to perform one or more operations of subsystems 121-124.

In some embodiments, the system 100 may initialize a set of hierarchical agents for populating or interacting with user interface (UI) elements (e.g., buttons, data entry fields, sliders, checkboxes, etc.) and use the set of hierarchical agents to update the UI elements. For example, a web browser (either on a client computer or being executed on a distributed computing system) can display an application UI in a runtime environment of the web browser. In the same runtime environment, a program (e.g., an add-on to a web browser, a standalone application, etc.) may configure and update an agent hierarchy and execute the agent operations to populate or interact with UI elements by analyzing the detected UI elements being displayed in a web document controlling the presentation of the application UI. By initializing and executing the set of hierarchical agents in the same runtime environment as the web application, the set of hierarchical agents can dynamically respond to changes in the web application.

In some embodiments, the system 100 may determine a set of hierarchical agents and filter the data propagated between the agents based on the hierarchy. As an example, a parent agent may delegate a task to populate or interact with a UI element to a child agent. The child agent may be restricted to a subset of the data available to the parent agent, where the data available to the child agent may depend on the properties and other information associated with the UI element to be populated. For example, a user's vehicle information may be available to a parent agent, and the parent agent may restrict a child agent to only have access to a user vehicle's estimated number of miles driven. As another example, the parent agent may restrict a child agent to only a portion of a UI window (e.g., only a subset of the code for some of the UI elements displayed on the window, only a subset of the image data representing the rendering of the portion of the window, etc.) that is to be assessed by the child agent (e.g., so that the child agent only needs to find the right button in a small cutout of the screen). By reducing the data available to an agent that is tasked with performing a computationally expensive operation, the agent is able to provide an accurate result with a significantly reduced computation time.

In some embodiments, the system 100 may determine a set of hierarchical agents in the same runtime environment as a web document and populate fields of the web document with the set of hierarchical agents. In certain scenarios, the system 100 may be uncertain about the input data type of a field. The system 100 may increase the likelihood of accurately populating such UI elements by generating a rendering using the web document and providing the rendering to an image recognition model (e.g., a convolutional neural network (CNN)). By reserving the use of an image recognition model for uncertain data fields, some embodiments may detect information on the visual vicinity of an information field.

In some embodiments, multiple sets of hierarchical agents may be concurrently executed and operated such that data entered into a first runtime environment can be sent to a second runtime environment for use by an agent operating in that second runtime environment. As an example, a computer may access a controlling web application using a web browser, where the controlling web application is being executed in a controlling runtime environment. The controlling web application may cause the computer to initiate first and second web browsers with their corresponding first and second runtime environments. The first and second web browsers may initialize different web applications (e.g., by visiting different universal resource locators (URLs)). The system 100 may initialize a first set of hierarchical agents in the first runtime environment and a second set of hierarchical agents in the second runtime environment, where both sets of hierarchical agents may be operated concurrently to populate their respective application UI elements. Furthermore, data entered into the controlling runtime environment by a user (e.g., inputting "50" into a text entry field representing user age) can then be shared with the first and second runtime environments and used by their respective sets of hierarchical agents. By generating and using multiple sets of hierarchical agents and sharing data between their respective runtime environments, some embodiments may increase cross-application communication efficiency and eliminate redundant data entry or other actions.

In some cases, the system 100 may construct a set of hierarchical agents in a runtime environment that uses a healing mechanism to accurately populate UI elements. For example, a set of hierarchical agents operating in a first runtime environment may encounter a UI element and determine confidence values indicating likelihoods that the UI element should be populated with one or more known values in a dataset representing available context data. In response to a determination that none of the confidence values satisfy a confidence threshold, some embodiments may update a second web document (e.g., the HTML code of a controlling web application) loaded in a second runtime environment. The updated web document may cause a rendering of that second web document to display an input field for a user to provide a user-entered value. Some embodiments may then store this user-provided value into a database in association with available UI element identifier information or provide the user-entered data to the first runtime environment to populate the previously empty UI element. Furthermore, the user-entered data may be shared with additional hierarchical agents in other runtime environments. After populating the previously unknown UI element, the system 100 may then proceed to populate additional UI elements.

While one or more operations are described herein as being performed by particular components of the system 100, those operations may be performed by other components of the system 100 in some embodiments. For example, one or more operations described in this disclosure as being performed by the set of servers 120 may instead be performed by the computing device 102. Furthermore, some embodiments may communicate with an application programming interface (API) of a third-party service via the network 150 to perform various operations disclosed herein. For example, some embodiments may use an agent executing on the computing device 102 or the set of servers 120 to send a query to a machine learning model hosted on a cloud computing service.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store agent data, environment data, user data, etc.

In some embodiments, a communication subsystem 121 may send data to or receive data from various types of information sources or data-sending devices, including the computing device 102. For example, the communication subsystem 121 may receive user data provided in a first computing environment executing in a web browser on the computing device 102. Furthermore, the communication subsystem 121 may send data from the set of servers 120 to the computing device 102 or to other computing devices, where the data may include user-provided information, other types of user information, input values generated by machine learning models, other types of input values generated by the set of servers 120, etc.

In some embodiments, a UI document analysis subsystem 122 may perform operations to detect UI elements, retrieve values used in relation to a UI, or otherwise manage user data. In some embodiments, the UI document analysis subsystem 122 may decompose a web document that is being dynamically changed into a set of UI elements. For example, the UI document analysis subsystem 122 may process a web document written in a markup language such as HTML to retrieve all interactive UI elements in the web document. In many cases, the web document itself may be the result of previous inputs, where different user inputs into a web application may modify the structure or presentation of the web application UI. It should be understood that, while the UI document analysis subsystem 122 may process the web document, some embodiments may provide program instructions or other data to a client computing device such as the computing device 102, where the sent program instructions or other data may cause the computing device 102 to perform document analysis operations described in this disclosure.

As used in this disclosure, a document may include a web document used to determine the visualization or operations of a web application, another type of document that may be interpretable by a web browser, or some other document that includes data that can determine or change the presentation on a display device. For example, a web document may include an HTML document that defines a UI screen of a web application, where the HTML document may be dynamically modified by JavaScript code or Cascading Style Sheet (CSS) documents. For example, a user may have provided previous inputs that cause a web application to load a first UI screen in lieu of a second UI screen based on a selection that the user is interested in accessing asset data instead of transaction data. In some embodiments, a set of hierarchical agents may be generated or updated based on the detected UI elements of the first UI screen.

Some embodiments may perform operations to process a document encoding UI elements of an application UI, such as the UI of a web application being displayed on a web browser or the UI of a native application executing on a mobile computing device. A UI element may include various types of components that are displayed in a UI. An application may include both non-interactive UI elements (e.g., a static data table) and interactive UI elements, such as UI elements that allow a user to provide data to the application (e.g., buttons, text fields, checkboxes, radio buttons, sliders, drop-down lists, etc.) or otherwise interact with the application.

Some embodiments may use a parsing system to decompose the UI code of one or more documents into a set of UI elements. For example, some embodiments may decompose a first example HTML code <form action="/submit-data" method="post"><label for ="name">Name: </label><br><input type="text" id="name" name="name"><br><br><label for ="email">Email: </label><br><input type="email" id="email" name="email"><br><br><input type="submit" value="Submit"></form>" into a first UI input element "<input type="text" id="name" name="name">," a second UI input element "<input type="email" id="email" name="email">," and a third UI input element "<input type="submit" value="Submit This Form">." Alternatively, or additionally, other UI input elements may include "<input type="button" value="Close Window" onclick="self. close( )">," "<input type="button" id="cancel_edit" value="Cancel">," etc. Some embodiments may use a rules-based parsing system to initially parse a document, such as parsing a document based on brackets, symbols, punctuation marks, spacing, character sequences, etc. For example, some embodiments may parse the first example HTML code based on the element identifiers defined by arrow brackets (e.g., "<label . . . >," "<input . . . >," etc.). Alternatively, or additionally, some embodiments may use combinations of delimiters or sequences of elements to parse a document. Furthermore, some embodiments may use a trained machine learning model, such as a transformer-based neural network, to decompose a document into a set of UI elements, such as a set of UI input elements.

When decomposing a document into a set of UI elements by analyzing the UI code of the document, some embodiments may preserve one or more properties of that UI element as an identifier of the element or as other data associated with the element. Furthermore, it should be understood that an identifier of a UI element may be a value explicitly assigned to "id," "identity," "identifier," synonymous with being an identifier. Alternatively, or additionally, an identifier of a UI element may have a different name or may be combined with other properties of the UI element to form the identifier. For example, the third UI element "<input type="submit" value="Submit This Form">" may be associated with the identifier "Submit This Form" based on the value. Alternatively, or additionally, an identifier of a UI element may be derived from a property of the UI element without being equal to either the property name or a value assigned to the property. For example, some embodiments may use a rules-based model or a machine learning model to assign the identifier "form submission button" to the third UI input element "<input type="submit" value="Submit This Form">."

Some embodiments may use a pre-existing application program interface connected with record text to obtain UI element information. For example, some embodiments may access or update a document using an in-memory representation of the document, such as a document object model (DOM). For example, some embodiments may implement the JavaScript code "var inputs=document.getElementsByTagName ('input')" to use a DOM method to collect all input elements that are labeled as "<input . . . >" (e.g., "<input type="email" id="email" name="email">."). After or while collecting the UI elements, some embodiments may store the collected UI elements in one or more ways, such as a list of elements that is kept in an HTML format, re-written in another markup language format (e.g., Extensible Markup Language (XML)), re-written in another structured document format (e.g., JavaScript Object Notation (JSON)), etc. It should be understood that references to updating a DOM may include updates to a document used to present some or all of a UI. Additionally, updates to a document may include updates to a DOM or to field data for a UI element presented in a UI.

Some embodiments may use an agent hierarchy configuration subsystem 123 to initiate, update, execute, remove, or otherwise manage a set of hierarchical agents. Some embodiments may determine a set of hierarchical agents based on one or more of various types of models or rules. For example, some embodiments may determine the number, types, and hierarchy of a set of hierarchical agents based on the capabilities of the agents, one or more goals assigned to the hierarchy, or one or more domain spaces or available models associated with agents of the hierarchy. Furthermore, the rules used to determine a set of hierarchical agents may be a hybrid combination of different models, such as a hybrid combination of a goal-based model and a capability-based model.

As an example, the agent hierarchy configuration subsystem 123 may obtain information about an application UI from the UI document analysis subsystem 122. The agent hierarchy configuration subsystem 123 may first configure a set of hierarchical agents to include a highest manager agent, where the highest manager agent has access to a global context indicating the identities of all UI elements of the application UI, a corresponding set of properties of the UI elements, user data, and other data available to a context of the application. For example, if the highest manager agent is configured in the runtime environment of a web browser, the highest manager agent can have access to, though is not necessarily limited to, all global variables available in that runtime environment. The highest manager agent or another aspect of the agent hierarchy configuration subsystem 123 may also include instructions to categorize different types of interactive UI elements indicated by the UI document analysis subsystem 122 or other UI elements provided to or otherwise obtained by the highest manager agent. The agent hierarchy configuration subsystem 123 may then initiate a set of sub-manager agents based on the categories associated with UI elements. In some embodiments, the categories may indicate a domain type for the data, such as user demographic information (e.g., age, gender, race, geographic location, etc.), vehicle information (e.g., vehicle make, vehicle model, vehicle year, vehicle color, vehicle condition, etc.), etc. Alternatively, or additionally, the categories may indicate an input data type, such as whether the input is a category selection from a drop-down menu, a free text input, a radio selection, a slider, etc.

An input data type may be a category associated with a value represented by a UI input element, such as an input domain type representing an information domain or an input method type representing a manner in which a UI input element is modified. For example, an input domain type may include "username," "education level," "number of times that a user had logged in," or another label used to define a value. Additionally, an input method type may include a category such as drop-down menu, text entry field, etc. It should be understood that a UI input element may be categorized with multiple categories, such as being categorized both as an input for a user's ownership time for a house and as a drop-down menu.

In some embodiments, the set of hierarchical agents may include only two layers of agents in the hierarchy of agents, where sub-manager agents that are below a manager agent in the hierarchy of a set of hierarchical agents directly perform tasks to determine input data for UI fields. Alternatively, the agent hierarchy configuration subsystem 123 may further determine additional agents that are below the hierarchy of the sub-manager agents. For example, a set of hierarchical agents may include three layers, such as a first manager layer including a highest manager agent, a first sub-manager layer including higher-level agents that are managed by the highest manager agent, and a leaf layer of agents managed by the higher-level agents of the first sub-manager layer. Alternatively, a set of hierarchical agents may include some other number of layers, such as four layers, five layers, or some other number of layers.

It should be understood that the branches of a set of hierarchical agents are not necessarily equal in length. For example, a first branch of a set of hierarchical agents may have three layers, and a second branch of the set of hierarchical agents may have five layers. As used in this disclosure, a leaf agent may be an agent that does not manage or otherwise direct tasks to another agent. Furthermore, while some embodiments may generate a set of hierarchical agents which use leaf agents as the task-performing agents, such an arrangement should not be considered limiting. For example, in some embodiments, a set of hierarchical agents may include one or more higher-level agents that perform a task in addition to directing portions of the task or a different task to a child agent.

Some embodiments may use a multi-agent control subsystem 124 to perform task delegation or task completion operations associated with a set of hierarchical agents. Some embodiments may perform delegation operations to determine which agents to use when interacting with a set of application UIs. The multi-agent control subsystem 124 may execute different applications in different runtime environments and coordinate communication between the different runtime environments to transfer user information, indications of missing information, indications of task completion, indications of task failure, indications of an error, or other information described in this disclosure. For example, the multi-agent control subsystem 124 may be executed in a first runtime environment or in relation to the first runtime environment, initialize and execute a web application in a second runtime environment, and transfer user data obtained in the first runtime environment to the second runtime environment.

After delegating a task to populate a target UI element to the appropriate agents of a set of hierarchical agents, the multi-agent control subsystem 124 may generate input data for the target UI element using the set of hierarchical agents. For example, some embodiments may delegate a task to populate the target UI element to the appropriate agent of the set of hierarchical agents based on information related to the target UI element, such as an input data type for the target UI element related to an input data type (i.e., a category or label that can be assigned to a value of a UI input element). Some embodiments may select an agent for a task based on an element identifier encoded in a UI input element. For example, if a UI input element includes the identifier "user-income," a manager agent may send a task to populate the UI input element to a first agent associated with user financial information. As described elsewhere in this disclosure, the first agent may be restricted to a subset of the context data available to the manager agent. The first agent may itself be a parent of a second and a third agent. The first agent may delegate the task to populate the UI input element to the second agent based on the identifier "user-income." An agent may delegate a task based on an identifier using one of various types of operations. In some embodiments, an agent may use a rule-based system to detect certain keywords or key phrases in an identifier and map the detected keywords or key phrases to a child agent. Alternatively, or additionally, some embodiments may use other methods to determine a child agent as a delegation target. For example, some embodiments may access an ontology of phrases and terms, where different terms may map to other terms as well as agents or agent types.

In some embodiments, the multi-agent control subsystem 124 may be executed in the same runtime environment used to present the application UI. For example, after initializing a web browser and accessing a web application in the runtime environment of the web browser, some embodiments may then execute a set of hierarchical agents in the same runtime environment as that of the web browser. By executing a dynamic set of hierarchical agents in the same runtime environment, changes to the application UI may cause a corresponding change to the dynamic set of hierarchical agents as well. For example, if an HTML document is updated to include a new UI element, a first agent of a dynamic set of hierarchical agents may detect the presence of the new UI element and determine an input data type based on identifier information associated with the new UI element (e.g., based on the "id" field of the UI element as represented by HTML code). The first agent may then delegate a task to populate the new data entry field to a second agent that is being used as a higher-level agent and a parent agent for a set of lower-level agents. As a part of the delegation process or concurrently with the delegation process, context data accessible to the first agent may be filtered for a relevant subset of data before being propagated to the second agent. For example, if the first data entry field is determined to be associated with the input data type "income," the first agent may delegate a task to populate the first data entry field to a second agent associated with input data type categories for income. The second agent may be restricted to user data categorized as being related to address information. The second agent may then delegate the task to populate the first data entry field to a third agent associated with populating free text entries associated with "income," which determine input data based on data available to the third agent.

The multi-agent control subsystem 124 may execute one or more sets of hierarchical agents in the runtime environments, where some embodiments may use a different set of hierarchical agents for each runtime environment. The multi-agent control subsystem 124 may execute the set of hierarchical agents to perform a corresponding set of tasks related to the corresponding set of application UIs. For example, the multi-agent control subsystem 124 may, in a first runtime environment, obtain an initial set of user data. The multi-agent control subsystem 124 may also initialize a second runtime environment using resources of the set of servers 120 or other resources accessible to the set of servers 120. For example, the multi-agent control subsystem 124 may use an application container to initialize a web browser and access a web application with the web browser. The runtime environment of the initialized web browser may serve as a second runtime environment.

It should be understood that different runtime environments may be run on different machines or may be run on the same machine. Though some embodiments may perform operations of the multi-agent control subsystem 124 using resources of the set of servers 120, alternative embodiments may perform some or all of the operations of the multi-agent control subsystem 124 using a client device, such as the computing device 102. For example, the computing device 102 may visit a first website to execute a web application in a controlling runtime environment of a web browser used by the computing device 102 to access the first website. Some embodiments may then provide program instructions to the computing device 102 that cause the computing device 102 to initialize multiple runtime environments separate from the controlling runtime environment. The computing device 102 may then execute a respective set of hierarchical agents for each respective runtime environment using operations described in this disclosure and transfer information obtained in the first runtime environment (e.g., provided via a UI of the first web application) to the respective runtime environment. Each respective set of hierarchical agents may then use the transferred information to populate or otherwise update the UI elements for the set of hierarchical agents. As described in this disclosure, populating a UI input element may include entering text into a text entry field, entering one or more numbers into a number entry field, selecting a category from a drop-down menu, selecting a button of a radio selection menu, checking a checkbox of a set of checkboxes, etc. A UI element may also be updated via other interactions with the UI element that do not involve populating a visible field of the UI element (e.g., submitting a form, moving the UI element, minimizing or hiding the UI element, closing a dialog window or other UI element, interacting with the UI element to navigate a web page or other document, etc.). As an example, in one use case involves the hierarchical order: Workflow Agent→Screen Agent→Input Agents, after the Input Agents are done populating input values into one or more fields of a UI, the Screen Agent may determine that the next course of action needs to be form submission. As such, the Screen Agent may delegate the submission action to a Submit Agent (e.g., where the Submit Agent is a lower-level agent relative to the Screen Agent).

In some embodiments, an agent of a set of hierarchical agents may use a machine learning model to perform one or more tasks delegated to a candidate agent. As described elsewhere in this disclosure, the agent using the machine learning model may be a lower-level agent that receives the task from a higher-level agent. Furthermore, as described elsewhere in this disclosure, the lower-level agent receiving the task may receive a limited subset of data available to the higher-level agent. For example, in one use case, a higher-level agent may have access to context data that includes a user-provided income, a user-provided credit score, or a user-provided savings amount. The higher-level agent may delegate a task to select an input value from a set of options representing ranges of income amounts to a lower-level agent, where the set of options may be obtained from property information in a UI input element. As a part of the delegation, the higher-level agent may restrict the context data available to the lower-level agent to be only the user-provided income. The lower-level agent may then generate a query based on the income value and the set of options and then provide the query to a large language model (LLM) or another machine learning model. In some embodiments, the lower-level agent may generate the query using a text template or another set of rule-based generation operations. Alternatively, or additionally, the lower-level agent may generate a query using natural language processing (NLP) operations. The LLM or other machine learning model may then output a proposed input value for the UI input element.

It should be noted that agents unrelated to data entry also benefit from the hierarchical delegation approach when operating on a reduced/focused context (e.g., greater accuracy, greater efficiency, etc.). For example, a parent agent may determine that a dialog (e.g., a popup dialog window or other dialog interface) needs to be closed as the next course of action. As such, rather than closing the dialog directly, the parent agent may use the dialog's bounding box or other context data to create a scoped-down/focused context that gets passed to a child agent that is then responsible for executing the "close" operation. As another example, with respect to closing a "popup" dialog, a parent agent may provide a child agent with a filtered UI context (e.g., only the subset of UI elements related to the popup dialog) and a "goal" (e.g., interaction data indicating that the dialog should be closed). Closing the dialog may require clicking a button (or perform one or more other actions), and the child agent may be required to determine which button to click or other actions to perform based on the filtered UI context and goal supplied by the parent agent. By progressively reducing the context that agents need to operate on to perform sub-tasks, the foregoing approach helps to increase accuracy and efficiency of the agents.

As described elsewhere in this disclosure, the use of a machine learning model may be computationally expensive. For example, in the case of an LLM, the use of an LLM may require hundreds, thousands, or even tens of thousands of graphics processing unit (GPU) hours for a single query. Furthermore, the size of a query may dramatically increase the token-level operations and computational costs of the query. Therefore, reducing the size of a query may result in a significant reduction in the number of token-level operations used to determine a result from the query. By reducing the amount of context data or other possible inputs to a query, some embodiments also reduce the size of a query provided to an LLM or another type of machine learning model used to determine an input value or other input data.

As described elsewhere in this disclosure, the LLM may be executed in a different environment than the environment used to execute a set of hierarchical agents. For example, some embodiments may execute a dynamic set of hierarchical agents in a same runtime environment as that used for an application UI. However, one or more agents of the set of hierarchical agents may perform operations that activate services, functions, applications, scripts, or other computing operations that operate outside the bounds of the runtime environment of the dynamic set of hierarchical agents and the application UI. By decoupling environments used to operate a machine learning model and the agent used to provide queries to the machine learning model, some embodiments may increase the versatility of a set of hierarchical agents by allowing agents to operate without waiting for a particular result from an LLM. Furthermore, decoupling the computing environment used to execute a machine learning model and the computing environment of an agent used to activate that machine learning model can dramatically reduce the computational load on what may be a computationally limited computing environment.

Furthermore, a document may include other data used to define information presented on a display device, such as additional data stored in a folder that is part of a runtime environment. In some embodiments, a document may include links or references to other documents or may be referenced by or linked to from other documents. In some embodiments, a document may store a model used to organize the presentation of a UI based on other documents.

As used in this disclosure, an agent may include various types of decision-making entities, such as autonomous software entities. A dynamic set of hierarchical agents may be created, modified, or removed in response to real-time updates to an input set of tasks. A set of hierarchical agents may perform a set of tasks by, for each respective task, determining which agent to delegate the respective task based on preestablished rules for task delegation. Furthermore, although an application may generate or use a set of hierarchical agents in a first runtime environment, the application itself may be executed in a second runtime environment.

Figure 2:
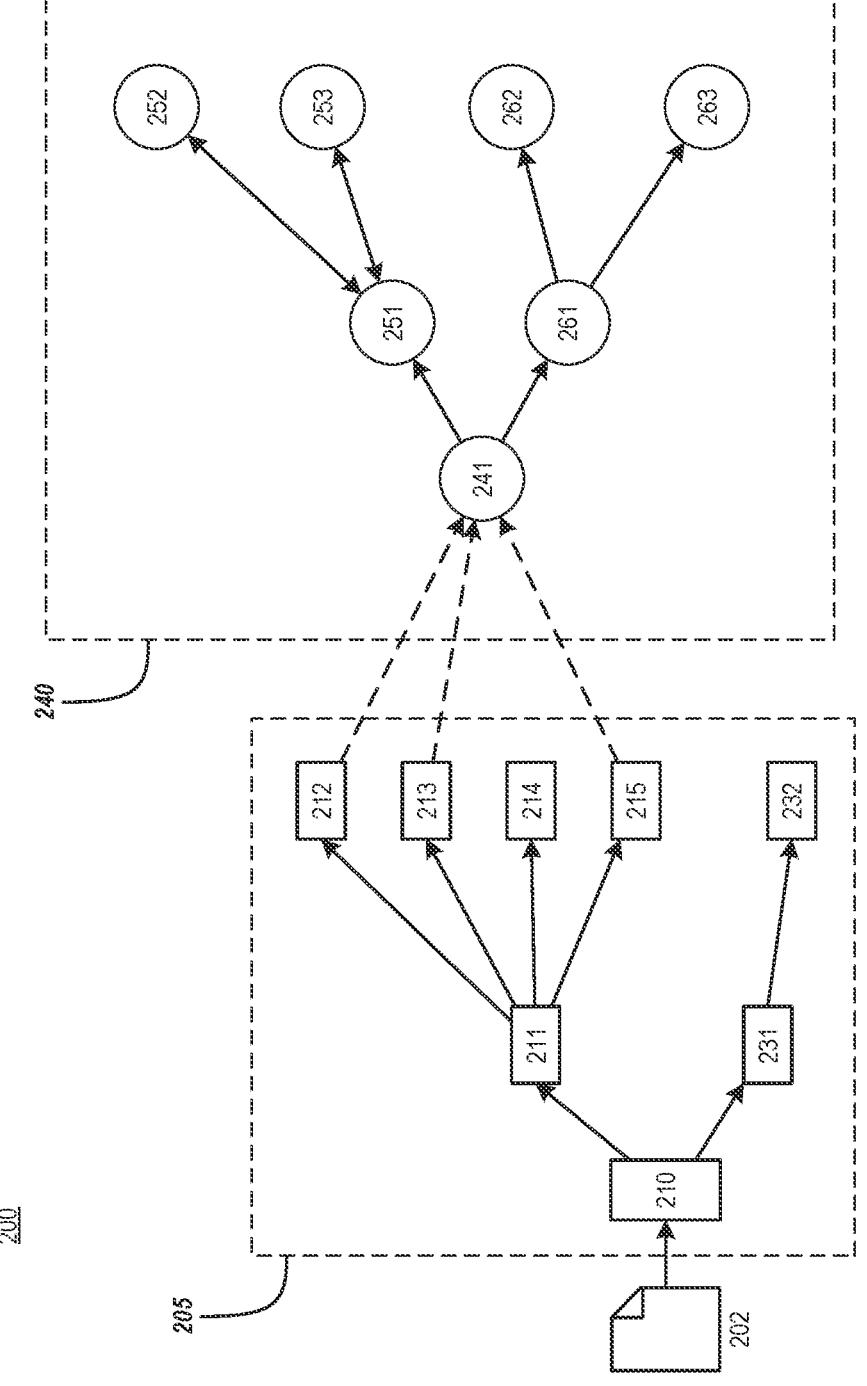
FIG. 2 illustrates a conceptual diagram of a domain object model of a web-based user interface (UI) and interaction with a hierarchical set of agents to populate fields in the UI or interact with other UI elements of the UI, in accordance with some embodiments.

FIG. 2 illustrates a conceptual diagram of a web document and operations to interact with UI elements of the web document using a set of hierarchical agents, in accordance with some embodiments. When a computer system 200 uses a web browser to access a web application at a URL, a server may provide a set of web documents to the computer system 200 that is then processed by the web browser to generate a dynamic web document 202. It should be understood that while the dynamic web document 202 is shown as a single document, some embodiments may collect the information represented by the dynamic web document 202 into multiple documents. In some embodiments, the dynamic web document 202 may be viewed, modified, or otherwise interacted with by a DOM. For example, the dynamic web document 202 may be represented by a DOM tree 205 starting at the root DOM node 210. The root DOM node 210 may represent a main element encoded by the dynamic web document 202. The second DOM node 211 may represent a first element within the element represented by the root DOM node 210. The third DOM node 231 may represent a second element that is within the element represented by the root DOM node 210 but is not within the element represented by the second DOM node 211. Each DOM node of DOM nodes 212-215 may represent elements within the element represented by the second DOM node 211. Similarly, a DOM node 232 may represent an element within the element represented by the third DOM node 231. In some embodiments, each respective DOM node of the DOM nodes 212-215 may represent a respective UI element.

Some embodiments may use operations described in this disclosure to generate a set of hierarchical agents 240 based on the UI elements represented by the DOM nodes 212-215 and the DOM node 232. Some embodiments may then use the set of hierarchical agents 240 to perform a set of tasks related to populating these UI elements by delegating the tasks to one or more agents and using the selected agents to perform the tasks. As described elsewhere in this disclosure, the construction and use of the set of hierarchical agents 240 may occur within the same runtime environment as that of the one used to present a UI defined by the dynamic web document 202 in order to allow the set of hierarchical agents 240 to respond to changes to the dynamic web document 202 in real time. Furthermore, agents of the set of hierarchical agents 240 may propagate data from higher-level agents to lower-level agents in a controlled way, such that a lower-level agent is not provided data inaccessible to the high-level agent. As described elsewhere, such a controlled propagation of data can significantly reduce computational costs for expensive computing operations, such as machine learning operations.

As shown in FIG. 2, a manager agent 241 may determine a hierarchy for the set of hierarchical agents 240 such that the hierarchy includes a higher-level agent 251, where the higher-level agent 251 is a child agent of the manager agent 241. The higher-level agent 251 may also act as a parent agent of a first lower-level agent 252 and a second lower-level agent 253. Additionally, the manager agent 241 may serve as a parent agent for a second higher-level agent 261, where the second higher-level agent 261 may act as a parent agent for a third lower-level agent 262 and a fourth lower-level agent 263.

In relation to determining the agents and structure of the set of hierarchical agents 240, the manager agent 241 may collect information from the DOM tree 205, where such information includes information related to the identities and properties of UI elements represented by the DOM nodes 212-215 and the DOM node 232. Some embodiments may then configure the hierarchical relationship between other agents of the set of hierarchical agents 240 by determining which agents will be needed based on element identifier information or other information related to the DOM nodes 212-215 and the DOM node 232. For example, the manager agent 241 may use a set of configuration rules to select and initialize agents based on a data table or an ontology graph mapping matching terms in the element identifier information with agents. Alternatively, or additionally, some embodiments may use an ontology graph, statistical algorithms, or machine learning-based algorithms to select a set of most applicable agents for use in the set of hierarchical agents 240. In many cases, the selection of an agent may be simplified by pre-existing connections between higher-level agents and lower-level agents. For example, if the manager agent 241 determines that an income-related agent is required based on a predicted applicable agent provided by a neural network trained to select agents, the manager agent 241 may also automatically select a higher-level agent used to manage the income-related agent.

In some embodiments, the manager agent 241 may select agents based on element identifier information and other information related to the UI elements represented by the DOM nodes 212-215. In some embodiments, the manager agent 241 may select the first lower-level agent 252 and the second lower-level agent 253 based on a determination that (1) the UI elements corresponding to the DOM node 212 and the DOM node 213 include user identification information and (2) the first lower-level agent 252 and the second lower-level agent 253 are mapped to a domain representing user identification information. For example, the manager agent 241 may first decompose the dynamic web document 202 into UI elements and then scan the UI elements to obtain information related to the UI elements in order to retrieve the element identifier "user PIN" for the UI element represented by the DOM node 212. The manager agent 241 may then select an agent for use as the first lower-level agent 252 by using a data table that maps "user identification" to the selected agent. The manager agent 241 may perform similar operations when selecting agents for the second lower-level agent 253, third lower-level agent 262, and fourth lower-level agent 263 based on UI elements mapped to by the DOM node 213, the DOM node 214, the DOM node 215, or the DOM node 232. It should be understood that the same agent may be used for different UI elements. For example, if the UI elements represented by the DOM node 214 and the DOM node 215 are both titled with the identifier "previous employer" and have the same input data type, some embodiments may select the same agent to handle the UI elements represented by both DOM nodes.

The agents of the set of hierarchical agents 240 may be partially or completely constructed using operations performed in the same runtime environment storing the dynamic web document 202 or performing operations related to the dynamic web document 202. For example, the dynamic web document 202 may include HTML code that is being executed in a runtime environment of a web browser. In some embodiments, operations to construct the set of hierarchical agents 240 may be performed within the same runtime environment or the agents of the set of hierarchical agents 240 may be constructed within the same runtime environment. Furthermore, the dynamic updates to the dynamic web document 202 may be detected by the set of hierarchical agents 240 (e.g., via the manager agent 241) and the set of hierarchical agents 240 may be a dynamic set of hierarchical agents that dynamically respond to these changes. For example, if the dynamic web document 202 is updated by the execution of JavaScript code to add an additional data entry field, the manager agent 241 may obtain information related to the newly added additional data entry field and select an additional agent for inclusion in the set of hierarchical agents 240 based on the obtained information. The manager agent 241 may act dynamically with respect to the update to the dynamic web document 202 by updating the set of hierarchical agents 240 to include the selected agent. Such dynamic operations may be efficiently performed by being executed in the same runtime environment as that used to execute instructions based on the dynamic web document 202, thus mitigating the network and timing costs of additional API calls and asynchronous communication methods.

After the set of hierarchical agents 240 is configured, the manager agent 241 may then delegate tasks to populate each UI element of the UI elements represented by the DOM nodes 212-215 based on identifier information or other information associated with the DOM nodes 212-215. For example, the manager agent 241 may obtain an identifier "total home value" from the UI element represented by the DOM node 215. The manager agent 241 may then delegate the task to populate the UI element to the second higher-level agent 261 based on the identifier. The second higher-level agent 261 may then delegate the task to the fourth lower-level agent 263 based on the identifier. Furthermore, as described elsewhere in this disclosure, some embodiments may filter the data being propagated from one agent to another in order to increase task performance efficiency. The fourth lower-level agent 263 may then provide relevant and available context data to a function, rules-based decision system, statistical model, or machine learning model to generate input data.

In some embodiments, the context data used to generate input data may include user-provided data that was provided in a different runtime environment. For example, the fourth lower-level agent 263 may use context data to form a query that is provided to an LLM, where the used context data may include a user-provided value representing home value and text identifiers representing a set of options indicating ranges of home values available in a drop-down menu. The LLM may then output a proposed UI input data, where the input data may be the user-provided value in some embodiments. Alternatively, the proposed UI input data may be an option from the set of options. In some embodiments, the agent used to determine the input data may then update the dynamic web document 202 based on the proposed UI input data. Alternatively, or additionally, a different agent or other subsystem may update the dynamic web document 202. Some embodiments may use an API of the DOM tree 205 to update the dynamic web document 202. For example, an LLM being used by an agent may provide "500K to 1M" as an output based on a query generated from a user-provided value of 576,000 and the set of range options. The agent may execute JavaScript code to update a UI element named "homeValRanges" having a set of range options "0 to 500K" and "500K to 1M" and by executing program code that includes the instructions "document.getElementById ('homeValRanges').value='500K to 1M'."

Figure 3:
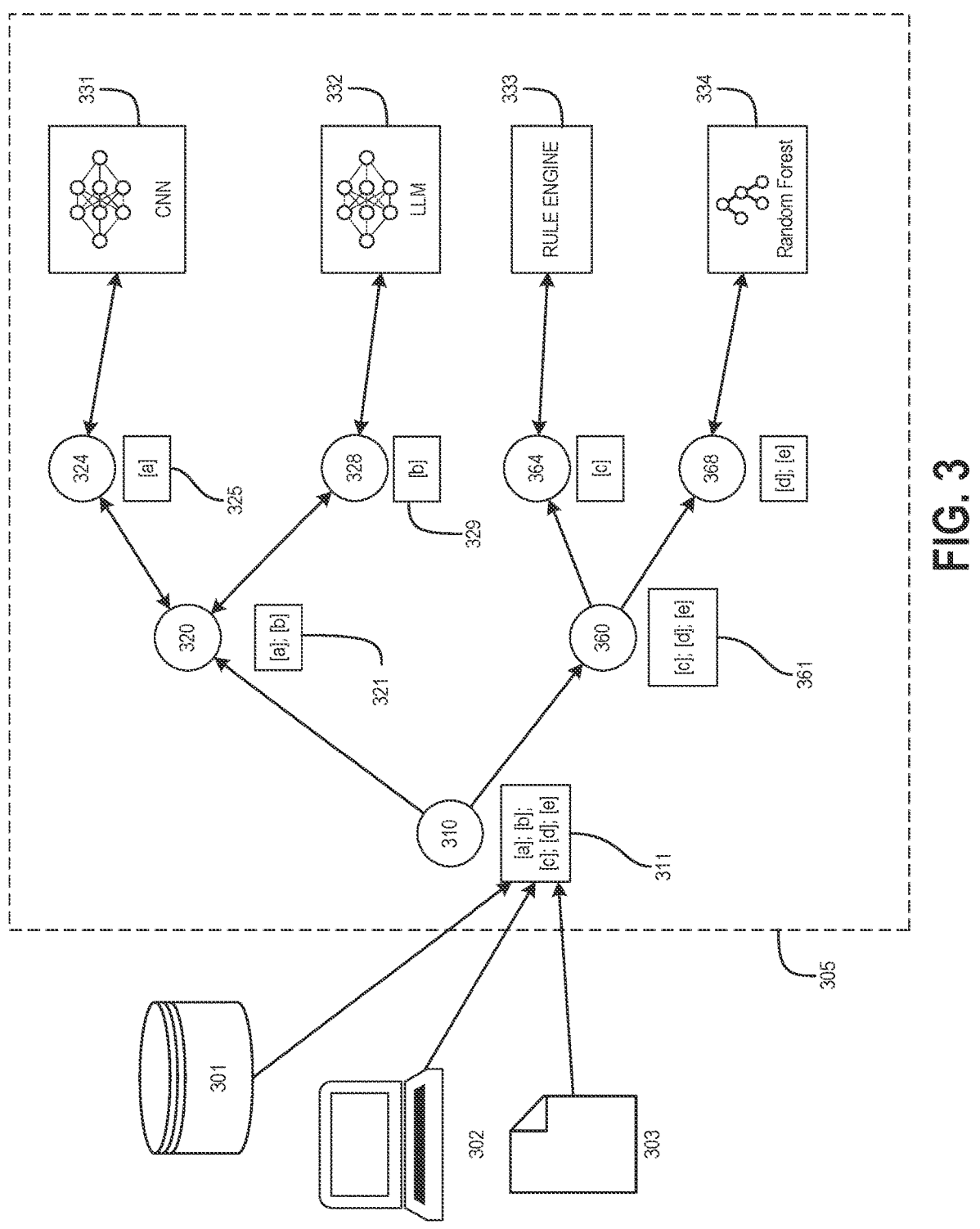
FIG. 3 illustrates a conceptual diagram of a state-controlled hierarchical set of agents, in accordance with some embodiments.

FIG. 3 illustrates a conceptual diagram of a set of hierarchical agents and the associated state data that the agents can access, in accordance with one or more embodiments. A database 301, a client computing device 302, and a web document 303 can each contribute to initial context data 311, where the initial context data 311 is accessible to a root agent 310. The root agent 310 may decompose the web document 303 to obtain a set of UI elements, including UI input elements. The root agent 310 may then determine other agents of a set of hierarchical agents 305 by selecting appropriate agents based on the UI elements, where the set of hierarchical agents 305 includes a first higher-level agent 320, a second higher-level agent 360, a first leaf agent 324, a second leaf agent 328, a third leaf agent 364, and a fourth leaf agent 368. Furthermore, the leaf agents 324, 328, 364, and 368 may include or control machine learning models or other decision systems. For example, the first leaf agent 324 can initialize a CNN 331, the second leaf agent 328 may control a LLM 332, the third leaf agent 364 may control a rule engine 333, and the fourth leaf agent 368 may control a Random Forest model 334. Furthermore, it should be understood that other agents may control other types of machine learning models.

Some embodiments may control the propagation of application state data and other data through the agents of an agent hierarchy tree. It should be understood that propagation of data from one agent to another may include actual data transfer (e.g., a first program operating as a parent agent may send user-provided data and other data to another program operating as a child agent). The propagation of data may also include the application of restrictions on accessible data. For example, some embodiments may include a first agent having access to a set of context data and include a second agent having access to a subset of the set of context data, where the second agent is a child of the first agent. As another example, when data represented by the initial context data 311 is propagated to the second higher-level agent 360, a subset of data 361 that is available to the second higher-level agent 360 includes data from the initial context data 311 but has been filtered to not include datasets labeled as "[a]" or "[b]."

In some embodiments, the propagated data made available to a child agent of a parent agent may be pre-configured such that no restrictions are newly implemented during the initial construction of a set of hierarchical agents. For example, an agent may be pre-configured to use only a specific type of data or a specific subset of data (e.g., pre-configured to only access numbers that are mapped to the input data type "age"). Alternatively, or additionally, some embodiments may dynamically restrict the data available to an agent during the initial configuration of the hierarchy for a set of hierarchical agents or during a later update to the hierarchy for the set of hierarchical agents. For example, the root agent 310 may have access to the initial context data 311 and may first delegate a task to interact with or update a UI element to the first higher-level agent 320.

In some embodiments, as a part of the operations to delegate the task to the first higher-level agent 320, the root agent 310 may apply a restriction to a data subset 321, which is a subset of the initial context data 311. Alternatively, in some embodiments, the first higher-level agent 320 may be pre-configured to be restricted to the data represented by the data subset 321. After being delegated the task, the first higher-level agent 320 may then re-delegate the task to the second leaf agent 328. In some embodiments, as a part of the delegation process, the first higher-level agent 320 may further apply a restriction on the data available to the second leaf agent 328 to only include information in a data subset 329, where the data subset 329 may be restricted into a subset of the data in the data subset 321. Once the task is received, the second leaf agent 328 may then provide the data subset 329 to the LLM 332 (e.g., by generating a query based on the dataset "[b]" and providing the query to the LLM 332). The LLM 332 may be executed in a different environment from that used to execute instructions encoded in the web document 303 or the set of hierarchical agents 305. For example, the LLM 332 may be executed in a cloud computing service that is asynchronously processed with respect to the environment used to execute the second leaf agent 328.

FIG. 4 is a flowchart of a process 400 for initializing a set of hierarchical agents in a runtime environment, in accordance with one or more embodiments. Some embodiments may obtain UI code of a document loaded in a runtime environment, as indicated by block 404. A document loaded in a runtime environment may include HTML code or other UI code being used to determine the appearance or values of a web application interface. Furthermore, in the context of a document used to present an application UI, the document may include other types of data accessible to a DOM or other type of model used to present the UI. Additionally, it should be understood that, while the runtime environment described in this disclosure may refer to a browser runtime environment, such examples are non-limiting, and other types of runtime environments may be used to execute applications and display UIs (e.g., a Node.js runtime environment, a Java runtime environment, a Python runtime environment, etc.).

As described elsewhere, the document may be generated or updated based on previous selections made by a user. For example, a user that interacts with an application UI may press a "next page" button in a first UI screen, where the subsequent UI screen will change appearance depending on the options that the user had selected in the first UI screen. By dynamically generating or updating a set of hierarchical agents using operations described in this disclosure, some embodiments may overcome challenges to the task of populating or otherwise interacting with UI input elements caused by changes in the structure of a UI or changes to the entire contents of the UI.

Some embodiments may determine a set of context data for use in the runtime environment, as indicated by block 406. Context data may include user-provided data, application state data, or other data accessible in a runtime environment. For example, context data may include a user-provided name, user login data, a token representing a data session, an amount of time that a user has been logged in, data retrieved from a user account, computing resources being used by an application, etc.

As described elsewhere in this disclosure, some embodiments may use context data provided in a user data entry UI screen in a controller UI environment to populate UI input fields displayed in other runtime environments. For example, a user operating a client device may initialize multiple runtime environments, including a first runtime environment for executing a manager application and one or more subservient runtime environments for executing other applications. Instructions and data obtained by the manager application may be used to update applications in the one or more subservient runtime environments. For example, a user may enter the value "orange" for a UI input element identified as "favorite fruit" in the first runtime environment. The manager application may then send the value "orange" to a second runtime environment, where a first set of hierarchical agents operating in the second runtime environment may populate a data entry field titled "favorite fruit" with the user-provided value "orange." Similarly, the manager application may also concurrently or at a later time send the value "orange" to a third runtime environment, where a second set of hierarchical agents operating in the third runtime environment may populate a data entry field titled "my favorite fruit" with the user-provided value "orange."

While agents may use values provided in concurrently executing runtime environments, agents may also use previously stored values. For example, some embodiments may store a user-provided value that was obtained in a previous communication session in a memory (e.g., in a database). Some embodiments may then retrieve the user-provided value from the memory in a later-initiated runtime environment and share the user-provided value with other runtime environments. For example, some embodiments may obtain a user identifier in a first runtime environment, select a user record mapped to the user identifier, and retrieve user information and other user-related values of the user record from a shared database accessible to both the first runtime environment and other runtime environments.

Some embodiments may decompose the UI code to retrieve UI elements, as indicated by block 408. In some embodiments, a document, such as an HTML document, may define some or all of an application UI. For example, an HTML document may cause a web browser to display a series of text entry fields, sliders, and drop-down menus in a web application UI. To decompose the UI code of the HTML document, some embodiments may parse the HTML document based on brackets and nesting structures. Some embodiments may then list UI elements for the purposes of being able to populate or interact with each UI element using a set of hierarchical agents. Some embodiments may also re-format the way in which a UI element is structured, such as by converting a UI element written in HTML into a data object.

Some embodiments may use a computer vision-based agent for LLM inference. As an example, some embodiments may determine that a text entry field is a UI input element but be unable to assign an input data type to the UI input element. Some embodiments may independently use computer vision operations to recognize UI elements. For example, some embodiments may provide information related to a target UI element encoded in a web document to a manager agent. The manager agent may provide the information to a neural network classifier or other machine learning model (e.g., a random forest) to obtain a set of categories for which context data is already known and a set of confidence values indicating accuracy likelihoods for the set of categories. In response to a determination that no confidence value of the set of confidence values satisfies a confidence threshold, some embodiments may determine that a set of available data does not include an input domain type usable to populate or interact with the target UI element. Some embodiments may then generate a rendering of the web document and then send some or all of the rendering to an image recognition model to help classify the UI element. For example, some embodiments may send a portion of the rendering (e.g., a portion defined by a pre-determined amount of horizontal space, a pre-determined amount of vertical space, etc.) to an image recognition model. The image recognition model may then determine an input method type based on results of the image recognition model and delegate the UI element based on the input method type determined from nearby text or other information.

Some embodiments may use computer vision operations in combination with other methods (e.g., methods based on a text identifier naming a UI element) to confirm an input data type for the UI element. As an example, a manager agent may predict an input data type for a UI element based on computer vision results and property information provided in the element UI code by determining a first prediction based on the property information and determining a second prediction based on the computer vision results. In cases where both the first and second predictions agree on an input domain type or other input data type for the UI input element, the manager agent may select an agent or perform other operations based on the input domain type or other input data type. In cases where the first and second predictions are not in agreement, the manager agent may use an agent that weighs the corresponding confidence values for the first and second predictions to determine a final prediction.

Some embodiments may determine a set of hierarchical agents based on the UI elements, as indicated by block 412. A manager agent, an agent hierarchy configuration service, another service, or another application may perform operations to determine the type and relationships of agents for a set of hierarchical agents. For example, some embodiments may determine the total number of different input domain types and select a set of agents based on the different input domain types. Alternatively, or additionally, different input domain types may be associated with the same agent, and the same agent may be used to handle different input domain types. For example, a same text entry agent may be used for all input domain types so long as the input data type is text entry.

In some embodiments, an agent or another application may detect real-time updates to a UI, such as by detecting changes in the UI code used to display a UI. The agent or other application may then update the set of hierarchical agents in response to the detected updates. For example, an agent may detect that an additional set of UI elements is visible in response to a previous user-provided entry. In response, a managing agent may determine what input data types (e.g., input domain types, input method types, etc.) correspond with the newly visible UI elements. The managing agent may then update the set of hierarchical agents based on the additional set of UI elements. For example, the managing agent may determine that a newly visible UI includes a drop-down menu and that an existing set of hierarchical agents are not sufficient to populate the newly visible UI elements.

Some embodiments may delegate a task to populate or interact with a UI element to selected agents of a set of hierarchical agents based on UI element information, as indicated by block 416. UI element information may include an identifier of the target UI element (e.g., a value assigned to the "id" property of a UI element or a constructed identifier generated from one or more properties of the UI element). Some embodiments may use this UI information during task delegation operations. For example, a higher-level agent may detect a match between a UI element identifier of a target UI element and a known element title, where the known element title may be mapped to a known input data type associated with an agent of the set of hierarchical agents. The higher-level agent may then delegate the task to populate the target UI element to the lower-level agent.

Some embodiments may delegate tasks to leaf nodes based on a predicted category provided by a prediction model and a corresponding confidence value associated with the category. For example, a task delegation operation may be based on results of a neural network used by a higher-level agent to classify a task. In some embodiments, a manager agent or another higher-level agent may provide a UI element identifier to a neural network classifier in order to obtain a semantic element prediction that matches to a known semantic element, where the known semantic element may represent a category that is mapped to a target lower-level agent. Furthermore, some embodiments may determine an associated confidence value for the semantic element prediction. After determining that the associated confidence value is greater than a confidence value threshold or otherwise satisfies the confidence value threshold, the higher-level agent may then delegate the task to the target lower-level agent.

Some embodiments may generate a set of input values for the UI elements by using the set of agents, as indicated by block 420. In some embodiments, a user input value may be the same as a user-provided value. For example, an agent may determine that a user-provided value for the input domain type "user nickname" matches the identifier for a UI element of a UI and, in response, determine that the user-provided value should be the value used to populate the UI element. As described elsewhere in this disclosure, an agent may then update a document defining at least a part of the UI to present the user-entered value in a text entry field of the UI element.

While some embodiments may determine input data for a UI element that is the same as a user-provided value, some embodiments can determine input data that is different from any user-provided values. For example, a manager agent or another analysis application may determine a set of options selectable by a user by providing the set of text corresponding with the selectable categories to a language model to generate the set of options and then add this set of options to an available set of context data. The set of options may then be used as inputs for a machine learning model to determine which option is most applicable to a user-entered value or another value mapped to a user (e.g., a value within a numeric range, a value indicating user satisfaction, a value indicating historical user activity, etc.). For example, a UI element may be a category selection UI element (e.g., a drop-down menu, radio selection buttons, etc.). Some embodiments may determine machine-interpretable options based on these categories by using an LLM. Some embodiments may then select an option of the machine-interpretable options for use as input data based on a determination that a user-provided value is within a boundary indicated by the option. For example, an agent may convert a first option "2 to 3" and a second option "more than 3" into two machine-interpretable options using an LLM and then select the second option based on a user-entered value "5." Alternatively, an agent may determine that an option is an exact match with a user-provided value and select the option based on a determination that the user-provided value is equal to the option value. For example, an agent may (1) obtain the user-provided value "3" associated with the input domain type "user review, (2) obtain a set of options "1," "2," and "3," and (3) select the third option "3" based on a determination that the user-provided value "3" is equal to the value for the third option.

Some embodiments may use semantic vectors when generating input data. For example, some embodiments may use a semantic space encoder (e.g., a trained neural network encoder) to generate a set of semantic vectors based on text associated with UI-provided options. The semantic space encoder may transform a token sequence representing the text into a set of vectors in a semantic space. Furthermore, some embodiments may determine a nearest neighbor semantic vector with respect to the set of semantic vectors, where the nearest neighbor semantic vector is mapped to a known user value. For example, an agent may determine (1) a first semantic vector by providing a semantic encoder with a first sequence of tokens representing text of a first option and (2) a second semantic vector by providing the semantic encoder with a second sequence of tokens representing text of a second option. Some embodiments may then determine that an input semantic vector representing a user-provided value is closest to the second semantic vector and, in response, select the second option for use as an input value.

Some embodiments may predict input data based on a user-entered value or other value without directly assigning the user-entered value or other value to be the input data. For example, some embodiments may perform a set of mathematical operations, such as a set of arithmetic operations, to determine an input value. For example, a leaf agent may be tasked with performing a task to populate or interact with a UI element associated with a text descriptor that asks for a number of years of ownership of an asset. In some embodiments, the leaf agent may provide the text descriptor and available user data indicating a first date of asset ownership to an LLM. In some embodiments, the LLM may then directly output a number of years of ownership to use to populate the UI element. Alternatively, or additionally, the LLM may output an expression for the leaf agent to evaluate, where the expression may include an arithmetic expression that can be evaluated to be equal to the number of years of ownership.

Some embodiments may account for multi-modal input data types, such as input data types that require images. For example, a set of hierarchical agents may delegate a task to populate a UI element to an agent based on an identifier associated with the UI element (e.g., an identifier "confirmation image"). The agent may retrieve an image based on the identifier, where the image may be a pre-configured image (e.g., an image file that is referred to in a configuration file) or may be dynamically selected by the agent (e.g., selecting an image of a user identification card based on the identifier "ID card image"). Some embodiments may then interact with the UI element to upload or otherwise provide the image to a server used to store image data. Furthermore, after uploading the image, some embodiments may present a link to the uploaded image or display the image.

Furthermore, some embodiments may use metadata associated with media files, such as video or audio files, when handling media file uploads. For example, some embodiments may first determine that a UI element is associated with a media file upload option based on an identifier or properties related to the UI element. A root agent or other higher-level agent may then delegate a task to upload a target media file to a target agent (e.g., a leaf agent of an agent hierarchy) based on UI element information. For example, some embodiments may select a leaf agent for a media upload task based on a determination that the UI element is associated with media uploads and that properties of the UI element are associated with a domain mapped to the leaf agent. The target agent may have access to a set of candidate media files, retrieve metadata associated with the set of candidate media files, and select a target media file for upload based on the metadata. For example, the target agent may select a target media file based on a determination that metadata of the target media includes text that matches an identifier of a UI element. Alternatively, or additionally, the target agent may provide media metadata and UI element information to an LLM to select a media file having metadata that most matches one or more criteria based on the UI element information.

Some embodiments may update the document in the runtime environment based on a set of input values, as indicated by block 424. Some embodiments may update the document by populating the UI elements with the set of input values. Populating the UI elements may include performing operations to fill a text entry field with a predicted input value, moving a slider to a target position represented by the predicted input value, selecting one or more options in a drop-down menu indicated by the predicted input value, selecting one or more checkboxes/buttons indicated by the predicted input value, changing the size of a shape until the shape is at a target size indicated by the predicted input value, etc. In some embodiments, the agent may use program code to update an HTML document or a data document associated with the HTML document (e.g., a second document that is linked to in a DOM of the HTML document and used to populate a data entry field in a UI).

Some embodiments may determine whether there are additional UI elements to populate or interact with, as indicated by block 430. Some embodiments may use a set of hierarchical agents to populate or interact with each UI element of a UI. Alternatively, some embodiments may restrict the use of the set of hierarchical agents to a specific type of UI element. For example, some embodiments may restrict the use of a set of hierarchical agents to process UI elements related to an input data type (e.g., an input domain type, an input method type, etc.). Alternatively, or additionally, some embodiments may restrict the use of the set of hierarchical agents to process UI elements related to an input data type. For example, some embodiments may restrict the use of a set of hierarchical agents to process UI elements that request categorical data or text entry data and will not use the set of hierarchical agents to modify a more complex interactive element (e.g., fitting puzzle pieces together). In response to a determination that there are additional UI elements to populate, operations of the process 400 may select another UI element and return to operations described for block 416. Otherwise, operations of the process 400 may proceed to operations described for block 434.

Some embodiments may release computing resources used to operate one or more agents of the set of hierarchical agents, as indicated by block 434. In some embodiments, if a parent agent determines that all child agents have completed available tasks, the parent agent may indicate its own completion and free up resources used by the parent agent or children of the parent agent. Some embodiments may reduce the cost on resource-limited runtime environments by detecting that a subset of agents is no longer necessary to populate or interact with UI elements of a UI screen. Some embodiments may then release computing resources used to operate the subset of agents. By freeing up the resources used to operate unneeded agents, some embodiments may reduce the risk that the addition of an agent hierarchy to a runtime environment will severely impact application performance.

Figure 5:
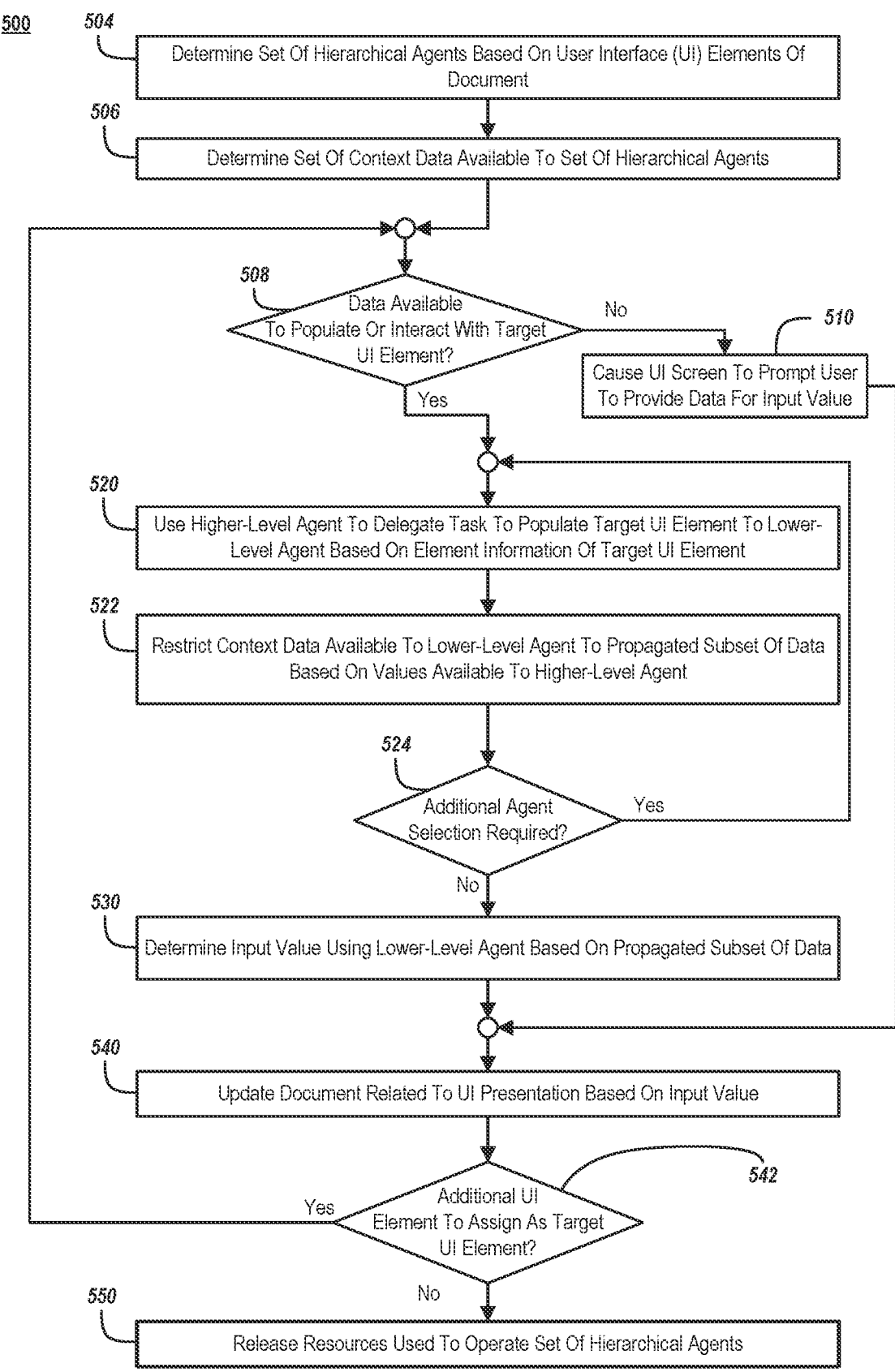
FIG. 5 is a flowchart of a process for intelligently restricting data (e.g., user-provided values, input data for input fields, context data, etc.) available to different agents in a set of hierarchical agents, in accordance with one or more embodiments.

FIG. 5 is a flowchart of a process 500 for intelligently restricting data available to different agents in a set of hierarchical agents, in accordance with one or more embodiments. Some embodiments may determine agent hierarchy for a set of hierarchical agents based on UI elements of a set of documents defining a UI, as indicated by block 504. Some embodiments may determine a set of hierarchical agents using a set of operations similar to or the same as those described for block 412 (FIG. 4). Furthermore, while some embodiments may execute a set of hierarchical agents in the same runtime environment as an application UI, some embodiments may generate the set of hierarchical agents in an environment different from the environment used to present the application UI.

Some embodiments may determine a set of context data available to the set of hierarchical agents, as indicated by block 506. Some embodiments determine the set of context data using a set of operations similar to or the same as those described for block 406 (FIG. 4). The set of context data available to a set of hierarchical agents may include user-provided values, user-provided data, etc.

Some embodiments may determine whether data is available to populate a target UI element, as indicated by block 508. In some embodiments, a set of hierarchical agents may determine that an input value should not be predicted for a target UI element with available data, including the set of context data. For example, a target element may include an identifier "favorite T-shirt." A set of hierarchical agents operating in a runtime environment may access a set of context data available in that runtime environment and determine that none of the available context data can be used to predict an input value for the target UI element.

When determining that an input value should not be predicted for a target UI element with available context data, some embodiments may use embeddings (e.g., embedding vectors). For example, a higher-level agent may use a machine learning model to generate a set of embeddings (e.g., a set of embedding vectors) by providing text associated with the UI element (e.g., an identifier of the UI element, text in proximity to the UI element, etc.) to the machine learning model. The machine learning model may also predict a set of input data types based on the embeddings and provide a related set of confidence values associated with the set of predicted input data types, where the set of input data types may be limited to input data types having known values (e.g., either a user provided the value, the value has been retrieved from a database, or the value is otherwise obtainable without further user input). For example, some embodiments may use a machine learning model that predicts semantic vectors representing phrase meaning based on a set of embeddings. The machine learning model may also provide confidence values associated with the semantic vectors and then determine whether an input value should be predicted for a target UI element based on the confidence values associated with the semantic vectors (e.g., by comparing the confidence values with a confidence threshold). For example, some embodiments may determine a set of predicted input data types that includes a first predicted input data type "user taxable home value" and second predicted input data type "user minimum home sale value" and provides the confidence value "0.15" for the first predicted input data type and "0.12" for the second predicted input data type. Some embodiments may then determine that the set of confidence values do not satisfy a set of confidence criteria (e.g., each respective confidence value is less than a confidence threshold equal to 50%). In response, some embodiments may determine that an input value should not be predicted for the target UI element with available data.

Some embodiments may cause a UI screen to prompt a user to provide data to determine an input value, as indicated by block 510. In response to a determination that an input value should not be predicted for a target UI element with available data, some embodiments may cause a UI to present a user with new prompts to obtain user-provided data usable to populate the target UI element. For example, based on a determination that a text field in a first application associated with the phrase "favorite milk" has no relevant user data, some embodiments may update the UI of a second application to ask a user to provide an answer for "favorite milk."

In some embodiments, the UI element may be assigned to a new input data type, where user-provided information may be associated with the new input data type. For example, some embodiments may first determine a set of hierarchical agents based on a set of known input data types corresponding with the UI elements of a decomposed web document. The set of hierarchical agents in a first runtime environment may then encounter a UI element having the identifier "favoriteCoffeeMug" that is in proximity to a first text sequence "please tell us the name of your favorite coffee mug." A manager agent or other agent of the UI may determine that a set of input data types available to the set of hierarchical agents do not include an applicable value that should be used to populate the UI element. For example, the manager agent may determine that the identifier does not match any known identifiers, and that semantic vectors that are derived from the identifier or the associated first text sequence are not within a threshold range of any vectors of a set of known semantic vectors. In cases where a semantic vector is within a threshold range of a closest vector of a set of known semantic vectors, the manager agent may then select the input data type mapped to the closest vector and retrieve user data associated with the selected input data type.

After determining that a set of input data types available to a set of hierarchical agents do not include an applicable value, some embodiments may then cause an application in a second runtime environment to prompt a user. For example, some embodiments may determine query text based on an identifier of a UI element or an associated text sequence related to the UI element. Furthermore, a new input data type may be generated based on the identifier, the first text sequence, or values derived from the identifier or first text sequence. For example, a web application on a second UI displayed by the second runtime environment may present a data entry form and include a future query text "field 'favoriteCoffeeMug' that is likely associated with instructions 'please tell us the name of your favorite coffee mug' is empty. Please provide an input for this field." A user may then enter a value to the web application, where this user-entered value may be stored in a database in association with the new input data type "favoriteCoffeeMug" and may be used to populate the UI element identified as "favoriteCoffeeMug" in the first runtime environment. Furthermore, it should be understood that one or more various methods may be used to generate the future query text. For example, the future query text may be a default value that is selected by default or selected based on a rules-based decision system, may be generated by a template, may be a direct copy of the identifier or the first text sequence, or may be a machine learning model text output based on the identifier or first text sequence.

Furthermore, while some embodiments may prompt a user to provide data in a text entry field or number entry field, other embodiments may obtain a user selection indicating an option of a first set of options and update the first document based on the user selection. For example, some embodiments may determine that a set of confidence criteria is not satisfied by a set of confidence values corresponding with predicted input data types for a UI element that indicates the first set of options. In response, some embodiments cause a UI to present a set of options derived from the first set of options, such as the same set of options, a first set of options having identifiers or associated text derived from an identifier or associated text of the first set of options.

Some embodiments may use a copy of the UI code or a modified version of the UI code when prompting a user for data. For example, some embodiments may detect a code portion of the HTML code used to generate an unpopulated text entry field in a first runtime environment. In response, some embodiments may then copy the code portion of the UI code used to generate the text entry field and send the copy to a second runtime environment to present to a user. For example, some embodiments may copy a code portion that recites "<label for =" service region ">Choose a service region: </label><select id=" serviceRegion "><option value=" option1">Location 1</option><option value="option2">Location 2</option></select>." By making a copy of the UI code, some embodiments may increase the likelihood that a user will provide an accurate answer and understand where the user answer is reflected in a document that is being processed using operations described in this disclosure. Furthermore, after receiving user data entered in association with an input data type, some embodiments may store the user-entered value for later use by additional applications.

Some embodiments may use a higher-level agent to delegate a task to populate the target UI element to a lower-level agent based on element information of the target UI element, as indicated by block 520. Some embodiments may use operations described for block 416 (FIG. 4) to delegate a task to a lower-level agent. For example, a root agent of a set of hierarchical agents may use an identifier "user age" of the target UI element to determine which higher-level agent should be delegated a task to populate the target UI element. The higher-level agent may then delegate the task to a lower-level agent based on the identifier, where the lower-level agent may be a leaf agent that does not re-delegate the task to another agent, or where the lower-level agent may itself be a parent agent that is higher in level than at least one other agent of the set of hierarchical agents.

As described elsewhere in this disclosure, some embodiments may use a computer vision model (e.g., an image recognition model) to delegate a task to an agent. For example, some embodiments may determine that a confidence value associated with a first prediction derived from an element identifier of a UI element does not satisfy a threshold. In response, some embodiments may generate a rendering based on a document that includes the element identifier (e.g., HTML document) and provide at least a portion of the rendering to a trained CNN model to detect a text sequence in proximity to the UI element. In some embodiments, text in visual proximity to a UI element may include text that is on a same horizontal line or same vertical line as the UI element. Some embodiments may then determine a set of predicted input data types by providing the detected text sequence to a neural network transformer model.

Some embodiments may restrict context data available to the lower-level agent to a propagated subset of data based on values available to the higher-level agent, as indicated by block 522. Some embodiments may limit context data available to the lower-level agent based on the input data types mapped to the lower-level agent. A propagated subset of data available to a lower-level agent is restricted with respect to the data available to a parent agent or other higher-level agent of the lower-level agent. For example, the lower-level agent may access a subset of context data without being able to access other values of the context data. By providing a subset of values from an initially available set of data to a lower-level agent without providing other values of the available set of data, some embodiments may reduce the computational complexity and cost of operations performed by the lower-level agent.

In some embodiments, data restrictions may be applied at some or all layers of a set of hierarchical agents. For example, if a higher-level agent has data that includes values "x1," "y2," and "z2," a lower-level agent of the higher-level agent may be restricted to only the values "x1" and "y2." Furthermore, it should be understood that a delegating agent may itself be a child agent that has already had its available data restricted. For example, a grandparent agent of a set of hierarchical agents may have access to values in datasets "x1," "x2," and "x3." The grandparent agent may delegate a task to a first agent, where data restrictions are applied to the first agent such that the first agent can access datasets "x1" and "x2" without being able to access "x3." The first agent may then delegate the task to a second agent, where data restrictions are applied to the second agent such that the second agent has access to the dataset "x1" without being able to access "x3" or "x2." By restricting the first agent to a broader propagated subset and restricting the second agent to a narrower propagated subset, some embodiments may permit the first agent to more robustly delegate data to different lower-level agents.

Some embodiments may account for multi-modal inputs (e.g., voice inputs, image inputs, video inputs) when restricting data available to lower-level agents. In some embodiments, a propagated subset of data available to a lower-level agent may include media data that is associated with a set of media objects (e.g., by being associated with object labels used to identify or characterize the set of media objects). Some embodiments may use a higher-level agent to determine that the first UI element is associated with a media upload tag and, in response, restrict the data available to a lower-level agent to include the media data. The lower-level agent may then use the propagated media data to generate or select a media for upload to an application UI.

Some embodiments may determine whether an additional agent selection is required, as indicated by block 524. In some embodiments, a set of hierarchical agents may automatically delegate a task to a leaf agent in accordance with a pre-configured set of rules, where the leaf agent is configured with performing the task. Alternatively, some embodiments may delegate a task among a selected set of agents such that more than one agent of the selected set of agents performs some aspect of the task. Some embodiments may determine that an additional agent selection is required based on a determination that at least one aspect of the task has not been completed. Based on a determination that an additional agent selection operation is required, some embodiments may return to operations described for block 520 (where the previous lower-level agent may be treated as a higher-level agent). Otherwise, operations of the process 500 may proceed to operations described for block 530.

Some embodiments may determine an input value using a lower-level agent based on the propagated subset of data, as indicated by block 530. Some embodiments may determine an input value using operations similar to or the same as those described for block 420 (FIG. 4). For example, a lower-level agent may retrieve a user-provided value and select the user-provided value for use as a predicted input value. Alternatively, a lower-level agent, such as a leaf agent, may generate a query based on a user-provided value and information related to a UI element (e.g., the values of a set of options) and provide the query to an LLM to obtain a predicted input value. Furthermore, some embodiments may use different agents to perform a combined task. For example, some embodiments may use a first agent to generate a query and then use a second agent to provide the query to an LLM to obtain a predicted input value.

Some embodiments may update the document or other data related to UI presentation based on the input value, as indicated by block 540. Some embodiments may update the document using operations similar to or the same as those described for block 424 (FIG. 4). For example, some embodiments may update data accessible via a DOM for an HTML file to change the input value shown in a data entry field using JavaScript code, where the HTML file is used to present a UI. The update may cause a rendering of the UI to show the input value.

Some embodiments may determine whether there is an additional UI element to assign as a target UI element to be populated, as indicated by block 542. Some embodiments may determine whether there is an additional UI element to assign as a target UI element to be populated by performing operations similar to or the same as those described for block 430 (FIG. 4). For example, some embodiments may determine that all UI elements associated with the input data type "blue" have been populated and, in response, release resources used to execute agents associated with the input data type "blue." If there is an additional UI element to assign as a target UI element to be populated, operations of the process 500 may return to operations described for block

508. Otherwise, operations of the process 500 may proceed to operations described for block 550.

Some embodiments may release resources used to operate the set of hierarchical agents, as indicated by block 550. When releasing resources, some embodiments may perform operations similar to or the same as those described for block 434 (FIG. 4). For example, some embodiments may determine that no additional UI element remains unprocessed by a set of hierarchical agents. In response, some embodiments may release the computing resources used by the set of hierarchical agents so that other computing operations may be executed with greater efficiency.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations described in relation to FIGS. 4-5.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. For example, some embodiments may perform operations of block 430 without performing operations of block 440. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

A.1 A method comprising: determining a set of hierarchical agents based on a document; delegating a task related to a UI element to a first agent of the set of hierarchical agents; restricting portions of data available to the first agent to a propagated subset based on information related to the first agent and data to a parent agent of the first agent; determining input data with the first agent based on the propagated subset; and updating the document based on the UI element and the input data.

A.2 A method comprising: determining a set of hierarchical agents comprising a first agent and a second agent above the first agent in a hierarchy of the set of hierarchical agents based on a document defining a user interface (UI), the set of hierarchical agents having access to initial context data; delegating a task related to a UI element (e.g., populating a UI input element, interacting with or updating another type of UI element, etc.) to the first agent based on information associated with the UI element; restricting portions of the initial context data available to the first agent to a propagated subset based on input data types mapped to the first agent and portions of the initial context data available to the second agent; generating input data by providing a machine learning model with the propagated subset and without at least one portion of the initial context data; and updating, based on the input data, the document with respect to the UI element.

A.3 A method comprising: determining a set of hierarchical agents comprising a parent agent and a child agent based on user interface (UI) elements of a web document that defines a UI, wherein the set of hierarchical agents is configured to access initial context data representing a global context of the web document to perform tasks related to populating the UI; delegating, to the child agent, a task to populate a target UI element of the UI elements by providing an element identifier of the target UI element to the parent agent; in connection with the delegation of the task to the child agent, restricting values of the initial context data available to the child agent to a propagated subset by determining the propagated subset based on input data types mapped to the child agent and values of the initial context data available to the parent agent; generating an input value with the child agent by providing a large language model with the propagated subset and without other values of the initial context data; and updating the web document by populating the target UI element based on the input value.

A.4 A method comprising: determining a set of hierarchical agents comprising a higher-level agent and a lower-level agent based on user interface (UI) elements of a document defining a UI, the set of hierarchical agents having access to initial context data; delegating a task related to populating a first UI element of the UI elements to the lower-level agent based on an identifier of the first UI element; restricting values of the initial context data available to the lower-level agent to a propagated subset based on input data types mapped to the lower-level agent and values of the initial context data available to the higher-level agent; generating an input value with the lower-level agent by providing a machine learning model with the propagated subset and without other values of the initial context data; and updating the document by populating the first UI element based on the input value.

A.5 The method of any of embodiments A.1 to A.4, wherein the document is a first document, and wherein the first document is loaded in a first runtime environment, further comprising: providing user data obtained in a controlling runtime environment to the first runtime environment and a second runtime environment; generating a set of embedding vectors based on text of a second UI element of a second document of the second runtime environment; determining a set of confidence values associated with predicted input data types by providing the set of embedding vectors to a prediction model, wherein each respective input data type of the predicted input data types corresponds with at least one respective value of the user data; determining a result indicating that the set of confidence values do not satisfy a confidence threshold; updating a third document loaded in the controlling runtime environment to cause a rendering of the third document to present an input field; and storing a user-entered value provided in the input field in association with the second UI element, wherein generating the input value comprises providing the machine learning model with the user-entered value.

A.6 The method of any of embodiments A.1 to A.5, wherein updating the third document comprises: retrieving a code portion of the second document, the code portion defining the second UI element; and updating the third document based on the code portion.

A.7 The method of any of embodiments A.1 to A.6, wherein determining the set of confidence values comprises: generating a semantic vector with the prediction model based on the set of embedding vectors; and determining a confidence value based on the semantic vector and a set of known semantic vectors mapped to known input data types associated with the user data.

A.8 The method of any of embodiments A.1 to A.7, wherein: the propagated subset comprises media data associated with a set of object labels; delegating the task comprises providing the identifier of the first UI element to the higher-level agent; and providing the identifier comprises determining that the first UI element is associated with a media upload tag.

A.9 The method of any of embodiments A.1 to A.8, wherein delegating the task to the lower-level agent comprises: determining a confidence value associated with a prediction by providing the element identifier to a prediction model; determining a result indicating that the confidence value does not satisfy a confidence threshold; based on the result indicating that the confidence value does not satisfy the confidence threshold, generating a rendering based on the document; determining a text sequence by providing at least a portion of the rendering to an image recognition model; and assigning a candidate agent to be the lower-level agent based on the text sequence.

A.10 The method of any of embodiments A.1 to A.9, wherein assigning the candidate agent to be the lower-level agent based on the text sequence comprises: determining a set of embeddings based on the text sequence and the element identifier; and selecting the candidate agent based on the set of embeddings.

A.11 The method of any of embodiments A.1 to A.10, wherein the set of hierarchical agents comprises a grandparent agent that is a parent with respect to the higher-level agent, and wherein the propagated subset is a narrower propagated subset, further comprising: delegating the task to the higher-level agent by providing the element identifier to the grandparent agent; and restricting, to a broader propagated subset, an amount of the initial context data available to the higher-level agent based on input data types mapped to the grandparent agent.

A.12 The method of any of embodiments A.1 to A.11, further comprising: determining a result indicating that the lower-level agent has generated the input value; and releasing resources used to execute the lower-level agent based on the result indicating that the lower-level agent has generated the input value.

A.13 The method of any of embodiments A.1 to A.12, wherein the UI is a first UI of a first application, further comprising: storing a user-provided value obtained via a second UI of a second application; and configuring the initial context data to comprise the user-provided value, wherein the propagated subset comprises the user-provided value.

A.14 The method of any of embodiments A.1 to A.13, wherein the document is a first document, and wherein the UI is a first UI, and wherein the UI element is a first UI element, and wherein the initial context data comprises user data, the method further comprising: generating a set of predicted input data types and a set of confidence values that is associated with the set of predicted input data types by providing identifier information associated with a second UI element of the document to a prediction model, wherein each respective input data type of the set of predicted input data types corresponds with at least one respective value of the user data; determining a result indicating that the set of confidence values do not satisfy a set of confidence criteria; updating a second document defining a second UI to cause a rendering of the second document to present an input field based on the result; and updating the first document to populate the second UI element with a user-entered value obtained via the input field.

A.15 The method of any of embodiments A.1 to A.14, further comprising storing the user-entered value in association with an identifier associated with the second UI element.

A.16 The method of any of embodiments A.1 to A.15, wherein determining the set of hierarchical agents comprises generating agents based on a set of input data types, the method further comprising: categorizing the user-entered value with a new input data type; determining a future query text based on text associated with the second UI element; updating the set of input data types to comprise the new input data type; associating the future query text with the new input data type; and presenting, in a user interface, the future query text and a data entry field associated with the new input data type.

A.17 The method of any of embodiments A.1 to A.16, wherein the document is a first document, and wherein the UI is a first UI, and wherein the UI element is a first UI element, and wherein the initial context data comprises user data, the method further comprising: generating a set of predicted input data types and a set of confidence values that is associated with the set of predicted input data types by providing identifier information associated with a second UI element of the document to a prediction model, wherein each respective input data type of the set of predicted input data types corresponds with at least one respective value of the user data; determining a result indicating that the set of confidence values do not satisfy a set of confidence criteria; updating a second document defining a second UI to cause a rendering of the second document to present a set of options derived from the second UI element based on the result; obtaining a user selection indicating an option of the set of options; and updating the first document based on the user selection.

A.18 The method of any of embodiments A.1 to A.17, wherein updating the second document comprises: retrieving a code portion of the first document, the code portion defining the second UI element; and updating the second document to comprise the code portion.

A.19 The method of any of embodiments A.1 to A.18, the method further comprising obtaining a user-provided value, wherein: the propagated subset comprises the user-provided value; and generating the input value comprises performing an arithmetic operation based on the user-provided value.

A.20 The method of any of embodiments A.1 to A.19, wherein the set of hierarchical agents comprises a third agent that is above the second agent in the hierarchy of the set of hierarchical agents, and wherein the propagated subset is a narrower propagated subset, the method further comprising restricting, to a broader propagated subset, an amount of the initial context data available to the second agent based on data restrictions applied to the third agent.

A.21 The method of any of embodiments A.1 to A.20, the method further comprising: determining that the first agent has generated the input value; releasing resources allocated to the first agent based on a determination that the first agent has generated the input value.

A.22 One or more tangible, non-transitory, machine-readable media storing instructions that, when executed by a set of processors, cause the set of processors to effectuate operations comprising those of any of embodiments A.1 to A.21.

A.23 A system comprising: a set of processors and a set of media storing computer program instructions that, when executed by the set of processors, cause the set of processors to effectuate operations comprising those of any of embodiments A.1 to A.22.

B.1. A method comprising: determining a set of hierarchical agents within a first runtime environment based on a document; delegating a task related to a target UI element to an agent based on UI element information related to the target UI element; determining, via the agent, input data for the target UI element based on the target UI element and user information; and updating the document based on the target UI element and the input data.

B.2. A method comprising: determining, within a first runtime environment, a set of hierarchical agents based on UI elements of a document in the first runtime environment; delegating a task related to a target UI element to an agent of the set of hierarchical agents by providing, as an input, UI element information in the first runtime environment to the set of hierarchical agents; generating, via the agent of the set of hierarchical agents, input data for the target UI element of the UI elements, the agent using a machine learning model to generate the input data based on the target UI element and user information associated with a user; and updating, based on the input data, the document with respect to the target UI element.

B.3. A method comprising: decomposing, into UI elements, a dynamic web document that defines a UI within a first runtime environment, the dynamic web document being dynamically selected based on previous inputs; determining, within the first runtime environment, a dynamic set of hierarchical agents for the dynamic web document based on the UI elements; generating an input value for a target UI element of the UI elements by delegating a task to populate the target UI element to a leaf agent of the dynamic set of hierarchical agents by providing, as an input, an element identifier of the target UI element to the dynamic set of hierarchical agents, the leaf agent using a machine learning model outside the first runtime environment to generate the input value based on the target UI element and a user-provided value obtained in a second runtime environment; and updating the dynamic web document by populating the target UI element with the input value.

B.4. A method comprising: decomposing user interface (UI) code of a document loaded in a first runtime environment into UI elements; determining, within the first runtime environment, a dynamic set of hierarchical agents based on the UI elements; delegating a task related to populating a target UI element to an agent of the dynamic set of hierarchical agents by providing, as an input, UI element information associated with the target UI element in the first runtime environment to the dynamic set of hierarchical agents; generating, via the agent of the dynamic set of hierarchical agents, an input value for the target UI element of the UI elements, the agent using a machine learning model outside the first runtime environment to generate the input value based on the target UI element and a user-provided value obtained in a second runtime environment; and updating the document by populating the target UI element with the input value.

B.5. The method of any of embodiments B.1 to B.4, wherein the agent is a lower-level agent, and wherein the UI element information comprises an identifier of the target UI element, and wherein delegating the task comprises providing the UI element information to a higher-level agent of the dynamic set of hierarchical agents to cause the higher-level agent to delegate the task to the lower-level agent based on a match between the identifier and a known element title mapped to a known input data type.

B.6. The method of any of embodiments B.1 to B.5, wherein the agent is a lower-level agent, and wherein the UI element information comprises an identifier of the target UI element, and wherein delegating the task comprises: providing the identifier to a higher-level agent of the dynamic set of hierarchical agents; causing, via the higher-level agent, a neural network classifier to output a semantic element prediction matching a known semantic element and an associated confidence value based on the identifier; determining a result indicating that the associated confidence value satisfies a confidence value threshold; and delegating the task to the lower-level agent based on the result.

B.7. The method of any of embodiments B.1 to B.6, wherein the target UI element comprises a set of text corresponding with selectable categories, and wherein generating the input value comprises: determining a set of options by providing the set of text corresponding with the selectable categories to a language model to generate the set of options; determining a result indicating that the user-provided value is within a boundary indicated by a first option of the set of options; and using the first option as the input value based on the result.

B.8. The method of any of embodiments B.1 to B.7, wherein the target UI element comprises a set of text corresponding with selectable categories, and wherein generating the input value comprises: determining a set of options by providing the set of text corresponding with the selectable categories to a language model to generate the set of options; determining a result indicating that the user-provided value is equal to a first option of the set of options; and using the first option as the input value based on the result.

B.9. The method of any of embodiments B.1 to B.8, wherein the UI element information comprises a first identifier of the target UI element, and wherein the agent is a first agent, further comprising: delegating a second task to populate a second UI element to a second agent of the dynamic set of hierarchical agents by providing, as an input, a second identifier associated with the second UI element to the dynamic set of hierarchical agents; retrieving, via the agent, an image based on the second identifier associated with the second UI element; interacting with the second UI element to upload the image onto a server associated with the document; and causing a rendering of the document to display the image or a link to the image.

B.10. The method of any of embodiments B.1 to B.9, wherein the UI element information comprises an identifier of the target UI element, further comprising generating a rendering based on the document, wherein delegating the task to populate the target UI element to the agent comprises: determining a portion of the rendering corresponding with the target UI element; sending the portion of the rendering to an image recognition model; determining an input method type based on the image recognition model and the identifier; and delegating the target UI element to a leaf node of the dynamic set of hierarchical agents based on the input method type.

B.11. The method of any of embodiments B.1 to B.10, wherein updating the target UI element comprises presenting, on a display device, a rendering of the document as the target UI element is updated.

B.12. The method of any of embodiments B.1 to B.11, wherein the UI elements are a first set of UI elements, further comprising: decomposing a second document within a third runtime environment into second UI elements; generating a second hierarchy of agents based on the second UI elements; determining, within the second runtime environment, an agent hierarchy for a second dynamic set of hierarchical agents by categorizing each respective UI element of the UI elements; determining a set of input values using the second dynamic set of hierarchical agents; and updating the second document of the third runtime environment by populating a second set of UI elements indicated by the second document with the set of input values.

B.13. The method of any of embodiments B.1 to B.12, wherein the second runtime environment is ended before the first runtime environment is initialized, further comprising: storing the user-provided value into a memory; and retrieving the user-provided value from the memory, wherein generating the input value comprises providing the user-provided value stored in the memory to the dynamic set of hierarchical agents.

B.14. The method of any of embodiments B.1 to B.13, wherein the document is a first document, and wherein the set of hierarchical agents is a first set of hierarchical agents, and wherein the user information comprises a first user-provided value, and wherein the input value is a first input value, the method further comprising: obtaining the first user-provided value and a second user-provided value in a second runtime environment, wherein generating the input value comprises generating the input value based on the first user-provided value; updating the document to access a new UI screen defined by a second document in a third runtime environment; generating, in the third runtime environment, a second set of hierarchical agents based on additional UI elements of the second document; and providing the second user-provided value obtained in the second runtime environment to the third runtime environment to determine a second input value for a UI element of the third runtime environment.

B.15. The method of any of embodiments B.1 to B.14, further comprising: detecting that an additional set of UI elements is visible in response to a previous user-provided entry; and re-determining the set of hierarchical agents based on the additional set of UI elements.

B.16. The method of any of embodiments B.1 to B.15, wherein the UI element information comprises a first identifier of a first UI element, further comprising: delegating a second task to populate a second UI element to a leaf agent of the set of hierarchical agents by: determining a result indicating that the second UI element is associated with a media file upload option; and selecting the leaf agent based on the result indicating that the second UI element is associated with the media file upload option and a second element identifier of the second UI element; and determining a target media file using the leaf agent by: retrieving metadata associated with a set of candidate media files; selecting a first media file for use as the target media file of the set of candidate media files based on the metadata; interacting with the second UI element to upload the target media file.

B.17. The method of any of embodiments B.1 to B.16, wherein the target UI element comprises a set of text corresponding with selectable categories, and wherein generating the input value comprises: determining a set of options by providing the set of text corresponding with the selectable categories to a language model to generate the set of options; determining a result indicating that a user-provided value of the user information is within a boundary indicated by a first option of the set of options; and using the first option as the input value based on the result indicating that the user-provided value of the user information is within the boundary indicated by the first option of the set of options.

B.18. The method of any of embodiments B.1 to B.17, wherein the target UI element comprises a set of text corresponding with selectable categories, and wherein generating the input value comprises: determining a set of semantic vectors by providing the set of text corresponding with the selectable categories of the target UI element to a semantic space encoder to generate the set of semantic vectors; generating an input semantic vector based on a user-provided value of the user information; determining a nearest neighbor semantic vector based on a distance between the input semantic vector and the nearest neighbor semantic vector, wherein the nearest neighbor semantic vector is derived from a text corresponding with a first option; and using the first option as the input value.

B.19. The method of any of embodiments B.1 to B.18, the method further comprising: generating a rendering based on the document; and providing the rendering to an image recognition model to confirm an input data type of the target UI element.

B.20. The method of any of embodiments B.1 to B.19, wherein updating the target UI element comprises presenting, on a display device, a series of updates to a rendering as a field of the target UI element is populated.

B.21. The method of any of embodiments B.1 to B.20, further comprising: obtaining a user identifier; and retrieving at least one value of the user information from a shared database accessible from the first runtime environment and from a second runtime environment based on the user identifier, wherein generating the input value comprises providing the at least one value to the set of hierarchical agents.

B.22. One or more tangible, non-transitory, machine-readable media storing instructions that, when executed by a set of processors, cause the set of processors to effectuate operations comprising those of any of embodiments B.1 to B.21.

B.23. A system comprising: a set of processors and a set of media storing computer program instructions that, when executed by the set of processors, cause the set of processors to effectuate operations comprising those of any of embodiments B.1 to B.22.

What is claimed is:

1. A system for reducing computational costs from a use of machine learning models by dynamically restricting data provided to child agents, the system comprising one or more processors and one or more non-transitory, machine-readable media storing program instructions that, when executed by the one or more processors, perform operations comprising:

determining a set of hierarchical agents comprising a parent agent and a child agent based on user interface (UI) input elements of a first web document that defines a first UI, wherein the first web document is configured in a runtime environment, wherein the set of hierarchical agents is configured to access initial context data that comprises user data representing a global context of the first web document to perform tasks related to populating the first UI;

executing the parent agent and the child agent in the runtime environment;

delegating, to the child agent, a task to populate a target UI input element of the UI input elements by providing an element identifier of the target UI input element to the parent agent;

in connection with the delegation of the task to the child agent, dynamically restricting values of the initial context data available to the child agent to a propagated subset by determining the propagated subset based on input data types mapped to the child agent and values of the initial context data available to the parent agent;

generating a set of predicted input data types and a set of confidence values that is associated with the set of predicted input data types by providing identifier information associated with a second UI element of the first web document to a prediction model, wherein each respective input data type of the set of predicted input data types corresponds with at least one respective value of the user data;

determining a result indicating that the set of confidence values do not satisfy a set of confidence criteria;

updating a second web document defining a second UI to cause a rendering of the second web document to present an input field based on the result;

generating interaction data with the child agent by providing a large language model with the propagated subset and without other values of the initial context data; and updating, in real time, the first web document by populating the target UI input element based on the interaction data and to populate the second UI element with a user-entered value obtained via the input field.

2. A method comprising:

determining a set of hierarchical agents comprising a higher-level agent and a lower-level agent based on user interface (UI) elements of a first document defining a first UI, the set of hierarchical agents having access to initial context data that comprises user data, wherein the first document is configured in a runtime environment;

executing the higher-level agent and the lower-level agent in the runtime environment;

delegating a task related to a first UI element of the UI elements to the lower-level agent based on an identifier of the first UI element;

restricting, dynamically, portions of the initial context data available to the lower-level agent to a propagated subset based on input data types mapped to the lower-level agent and portions of the initial context data available to the higher-level agent;

generating a set of predicted input data types and a set of confidence values that is associated with the set of predicted input data types by providing identifier information associated with a second UI element of the first document to a prediction model, wherein each respective input data type of the set of predicted input data types corresponds with at least one respective value of the user data;

determining a result indicating that the set of confidence values do not satisfy a set of confidence criteria;

updating a second document defining a second UI to cause a rendering of the second document to present an input field based on the result;

generating input data with the lower-level agent by providing a machine learning model with the propagated subset and without other portions of the initial context data; and updating, in real time and based on the input data, the first document with respect to the first UL element and to populate the second UI element with a user-entered value obtained via the input field.

3. The method of claim 2, wherein the document is a first document, and wherein the first document is loaded in a first runtime environment, further comprising:

providing user data obtained in a controlling runtime environment to the first runtime environment and a second runtime environment;

generating a set of embedding vectors based on text of a second UI element of a second document of the second runtime environment;

determining a set of confidence values associated with predicted input data types by providing the set of embedding vectors to a prediction model, wherein each respective input data type of the predicted input data types corresponds with at least one respective value of the user data;

determining a result indicating that the set of confidence values do not satisfy a confidence threshold;

updating a third document loaded in the controlling runtime environment to cause a rendering of the third document to present an input field; and storing a user-entered value provided in the input field in association with the second UI element, wherein generating the input data comprises providing the machine learning model with the user-entered value.

4. The method of claim 3, wherein updating the third document comprises:

retrieving a code portion of the second document, the code portion defining the second UI element; and updating the third document based on the code portion.

5. The method of claim 3, wherein determining the set of confidence values comprises:

generating a semantic vector with the prediction model based on the set of embedding vectors; and determining a confidence value based on the semantic vector and a set of known semantic vectors mapped to known input data types associated with the user data.

6. The method of claim 2, wherein:

the propagated subset comprises media data associated with a set of object labels;

delegating the task comprises providing the identifier of the first UI element to the higher-level agent; and providing the identifier comprises determining that the first UI element is associated with a media upload tag.

7. The method of claim 2, wherein delegating the task to the lower-level agent comprises:

determining a confidence value associated with a prediction by providing the element identifier to a prediction model;

determining a result indicating that the confidence value does not satisfy a confidence threshold;

based on the result indicating that the confidence value does not satisfy the confidence threshold, generating a rendering based on the document;

determining a text sequence by providing at least a portion of the rendering to an image recognition model; and assigning a candidate agent to be the lower-level agent based on the text sequence.

8. The method of claim 7, wherein assigning the candidate agent to be the lower-level agent based on the text sequence comprises:

determining a set of embeddings based on the text sequence and the element identifier; and selecting the candidate agent based on the set of embeddings.

9. The method of claim 2, wherein the set of hierarchical agents comprises a grandparent agent that is a parent with respect to the higher-level agent, and wherein the propagated subset is a narrower propagated subset, further comprising:

delegating the task to the higher-level agent by providing the element identifier to the grandparent agent; and dynamically restricting, to a broader propagated subset, an amount of the initial context data available to the higher-level agent based on input data types mapped to the grandparent agent.

10. The method of claim 2, further comprising:

determining a result indicating that the lower-level agent has generated the input data; and releasing resources used to execute the lower-level agent based on the result indicating that the lower-level agent has generated the input data.

11. The method of claim 2, wherein the UI is a first UI of a first application, further comprising:

storing a user-provided value obtained via a second UI of a second application; and configuring the initial context data to comprise the user-provided value, wherein the propagated subset comprises the user-provided value.

12. One or more non-transitory, machine-readable media storing program instructions that, when executed by one or more processors, cause operations comprising:

determining a set of hierarchical agents comprising a first agent and a second agent above the first agent in a hierarchy of the set of hierarchical agents based on a first document defining a first user interface (UI), the set of hierarchical agents having access to initial context data that comprises user data, wherein the first document is configured in a runtime environment;

executing the first agent and the second agent in the runtime environment;

delegating a task related to a first UI element to the first agent based on information associated with the first UI element;

restricting, dynamically, portions of the initial context data available to the first agent to a propagated subset based on input data types mapped to the first agent and portions of the initial context data available to the second agent;

generating a set of predicted input data types and a set of confidence values that is associated with the set of predicted input data types by providing identifier information associated with a second UI element of the first document to a prediction model, wherein each respective input data type of the set of predicted input data types corresponds with at least one respective value of the user data;

determining a result indicating that the set of confidence values do not satisfy a set of confidence criteria;

updating a second document defining a second UI to cause a rendering of the second document to present an input field based on the result;

generating interaction data by providing a machine learning model with the propagated subset and without at least one portion of the initial context data; and updating, in real time and based on the interaction data, the first document with respect to the first UI element and to populate the second UI element with a user-entered value obtained via the input field.

13. The one or more non-transitory, machine-readable media of claim 12, further comprising storing the user-entered value in association with an identifier associated with the second UI element.

14. The one or more non-transitory, machine-readable media of claim 12, wherein determining the set of hierarchical agents comprises generating agents based on a set of input data types, the operations further comprising:

categorizing the user-entered value with a new input data type;

determining a future query text based on text associated with the second UI element;

updating the set of input data types to comprise the new input data type;

associating the future query text with the new input data type; and presenting, in a user interface, the future query text and a data entry field associated with the new input data type.

15. The one or more non-transitory, machine-readable media of claim 12, wherein the document is a first document, and wherein the UI is a first UI, and wherein the UI element is a first UI element, and wherein the initial context data comprises user data, the operations further comprising:

generating a set of predicted input data types and a set of confidence values that is associated with the set of predicted input data types by providing identifier information associated with a second UI element of the document to a prediction model, wherein each respective input data type of the set of predicted input data types corresponds with at least one respective value of the user data;

determining a result indicating that the set of confidence values do not satisfy a set of confidence criteria;

updating a second document defining a second UI to cause a rendering of the second document to present a set of options derived from the second UI element based on the result;

obtaining a user selection indicating an option of the set of options; and updating the first document based on the user selection.

16. The one or more non-transitory, machine-readable media of claim 15, wherein updating the second document comprises:

retrieving a code portion of the first document, the code portion defining the second UI element; and updating the second document to comprise the code portion.

17. The one or more non-transitory, machine-readable media of claim 12, the operations further comprising obtaining a user-provided value, wherein:

the propagated subset comprises the user-provided value; and generating the interaction data comprises performing an arithmetic operation based on the user-provided value.

18. The one or more non-transitory, machine-readable media of claim 12, wherein the set of hierarchical agents comprises a third agent that is above the second agent in the hierarchy of the set of hierarchical agents, and wherein the propagated subset is a narrower propagated subset, the operations further comprising dynamically restricting, to a broader propagated subset, an amount of the initial context data available to the second agent based on data restrictions applied to the third agent.

19. The one or more non-transitory, machine-readable media of claim 12, the operations further comprising:

determining that the first agent has generated the interaction data;

releasing resources allocated to the first agent based on a determination that the first agent has generated the interaction data.

\* \* \* \* \*